United States Patent [19]
Stilp et al.

[11] Patent Number: 5,608,410
[45] Date of Patent: *Mar. 4, 1997

[54] SYSTEM FOR LOCATING A SOURCE OF BURSTY TRANSMISSIONS CROSS REFERENCE TO RELATED APPLICATIONS

[75] Inventors: Louis A. Stilp, Broomall, Pa.; Curtis A. Knight, Washington, D.C.; John C. Webber, Herndon, Va.

[73] Assignee: Associated RT, Inc., Pittsburgh, Pa.

[*] Notice: The term of this patent shall not extend beyond the expiration date of Pat. No. 5,327,144.

[21] Appl. No.: 212,552

[22] Filed: Mar. 11, 1994

Related U.S. Application Data

[63] Continuation-in-part of Ser. No. 59,248, May 7, 1993, Pat. No. 5,327,144.
[51] Int. Cl.$^6$ .............................. G01S 1/24; G01S 3/02
[52] U.S. Cl. ............................. 342/387; 342/457
[58] Field of Search .................... 342/387, 457

[56] References Cited

U.S. PATENT DOCUMENTS

| | | | |
|---|---|---|---|
| 3,150,372 | 9/1964 | Groth, Jr. | 343/112 |
| 3,384,891 | 5/1968 | Anderson | 343/6.5 |
| 3,646,580 | 2/1972 | Fuller et al. | 325/53 |
| 3,680,121 | 7/1972 | Anderson et al. | 342/387 |
| 4,107,689 | 8/1978 | Jellinek | 343/112 |
| 4,177,466 | 12/1979 | Reagan | 343/112 TC |
| 4,297,701 | 10/1981 | Henriques | 343/6.5 LC |
| 4,415,770 | 11/1983 | Kai et al. | 179/2 |
| 4,433,335 | 2/1984 | Wind | 343/463 |
| 4,596,988 | 6/1986 | Wanka | 343/457 |
| 4,638,321 | 1/1987 | Drogin | 342/444 |
| 4,639,733 | 1/1987 | King et al. | 342/424 |
| 4,651,156 | 3/1987 | Martinez | 342/457 |
| 4,651,157 | 3/1987 | Gray et al. | 342/457 |
| 4,667,202 | 5/1987 | Siemens | 342/455 |
| 4,728,959 | 3/1988 | Maloney et al. | 342/457 |

(List continued on next page.)

FOREIGN PATENT DOCUMENTS

| | | |
|---|---|---|
| 0345601 | 12/1989 | European Pat. Off. . |
| 3335128A1 | 4/1985 | Germany . |
| 0151301 | 11/1979 | Japan . |
| 0203025 | 8/1988 | Japan . |
| 0046333 | 2/1989 | Japan . |
| 0029037 | 1/1990 | Japan . |
| 0090736 | 3/1990 | Japan . |
| 405083189A | 4/1993 | Japan . |
| 6-133357 | 5/1994 | Japan . |
| 2234649 | 2/1991 | United Kingdom . |
| WO88/01750 | 7/1987 | WIPO . |
| WO92/07429 | 4/1992 | WIPO . |
| WO93/01576 | 6/1992 | WIPO . |
| WO93/13631 | 7/1993 | WIPO . |

OTHER PUBLICATIONS

Document No. WO93/06685 PCT/US92/07970 Date Apr. 1, 1993 Country WOX.

Snigdha Prakash, "American Mobile Satellite Set to Market Produce Monitor," Washington Post.

DeSadaba, R., "Personal Communications in the Intelligent Network," British Telecommunications Engineering, vol. 9, Aug. 1990, pp. 80–83.

(List continued on next page.)

*Primary Examiner*—Gregory C. Issing
*Attorney, Agent, or Firm*—Woodcock Washburn Kurtz Mackiewicz & Norris

[57] ABSTRACT

A system for determining the location of a mobile transmitter is disclosed. The mobile transmitter receives a message signal and responds to the message signal by transmitting a responsive signal, wherein the responsive signal is indicative of the identity of the mobile transmitter. One preferred embodiment comprises at least three antenna site systems 10, a central site system 12, a database processor for use in connection with various applications, and a map system 16. The system may be employed to locate cellular telephones and/or like devices emitting bursty transmissions, e.g., over messaging or control channels.

22 Claims, 3 Drawing Sheets

U.S. PATENT DOCUMENTS

| | | | |
|---|---|---|---|
| 4,740,792 | 4/1988 | Sagey et al. | 342/457 |
| 4,742,357 | 5/1988 | Rackley | 342/463 |
| 4,791,572 | 12/1988 | Green, III et al. | 364/449 |
| 4,797,679 | 1/1989 | Cusdin et al. | 342/387 |
| 4,809,316 | 2/1989 | Namekawa | 379/58 |
| 4,818,998 | 4/1989 | Apsell et al. | 342/44 |
| 4,821,309 | 4/1989 | Namekawa | 379/58 |
| 4,870,422 | 9/1989 | Counselman, III | 342/357 |
| 4,888,593 | 12/1989 | Friedman et al. | 342/387 |
| 4,891,650 | 1/1990 | Sheffer | 342/457 |
| 4,897,642 | 1/1990 | DiLullo et al. | 340/825 |
| 4,908,629 | 3/1990 | Apsell et al. | 342/457 |
| 4,916,455 | 4/1990 | Bent et al. | 342/457 |
| 4,926,161 | 5/1990 | Cupp | 340/572 |
| 4,975,710 | 12/1990 | Baghdady | 342/442 |
| 4,976,619 | 12/1990 | Carlson | 434/16 |
| 4,977,399 | 12/1990 | Price t al. | 340/825 |
| 5,003,317 | 3/1991 | Gray et al. | 342/457 |
| 5,008,679 | 4/1991 | Effland et al. | 342/353 |
| 5,023,809 | 6/1991 | Spackman et al. | 364/516 |
| 5,023,900 | 6/1991 | Tayloe et al. | 379/32 |
| 5,055,851 | 10/1991 | Sheffer | 342/457 |
| 5,056,106 | 10/1991 | Wang et al. | 375/1 |
| 5,058,200 | 10/1991 | Huang et al. | 455/33 |
| 5,063,656 | 11/1991 | Sutherland | 340/989 |
| 5,095,500 | 3/1992 | Tayloe et al. | 379/32 |
| 5,095,531 | 3/1992 | Ito | 455/331 |
| 5,101,501 | 3/1993 | Gilhousen et al. | 455/33 |
| 5,126,748 | 6/1992 | Ames et al. | 342/353 |
| 5,128,623 | 7/1992 | Gilmore | 328/1 |
| 5,142,281 | 8/1992 | Park | 340/991 |
| 5,150,310 | 9/1992 | Greenspun et al. | 364/516 |
| 5,153,902 | 10/1992 | Buhl et al. | 379/57 |
| 5,166,694 | 11/1992 | Russell et al. | 342/457 |
| 5,187,805 | 2/1993 | Bertiger et al. | 455/12.1 |
| 5,191,342 | 3/1993 | Alsup et al. | 34/465 |
| 5,208,756 | 5/1993 | Song | 364/449 |
| 5,218,367 | 6/1993 | Sheffer et al. | 342/457 |
| 5,218,618 | 6/1993 | Sagey | 375/1 |
| 5,223,844 | 6/1993 | Mansell et al. | 342/357 |
| 5,235,633 | 8/1993 | Dennison et al. | 379/60 |
| 5,247,439 | 9/1993 | Gurmu et al. | 364/424.02 |
| 5,287,541 | 2/1994 | Davis et al. | 455/12.1 |
| 5,289,183 | 2/1994 | Hassett et al. | 340/905 |
| 5,289,527 | 2/1994 | Tiedemann, Jr. | 379/59 |
| 5,293,642 | 3/1994 | Lo | 455/33.1 |
| 5,293,645 | 3/1994 | Sood | 455/54.1 |
| 5,297,049 | 3/1994 | Gurmu et al. | 364/436 |
| 5,299,132 | 3/1994 | Wortham | 364/460 |
| 5,305,466 | 4/1994 | Taketsugu | 455/54.1 |
| 5,307,278 | 4/1994 | Hermans et al. | 364/450 |
| 5,317,323 | 5/1994 | Kennedy et al. | 342/457 |
| 5,327,575 | 7/1994 | Menich et al. | 455/33.1 |
| 5,334,974 | 8/1994 | Simms et al. | 340/990 |
| 5,341,410 | 8/1994 | Aron | 455/33.1 |
| 5,343,493 | 8/1994 | Karimullah | 375/1 |
| 5,343,512 | 8/1994 | Wang et al. | 379/59 |
| 5,355,511 | 10/1994 | Hatano et al. | 455/11.1 |
| 5,361,396 | 11/1994 | Onoe et al. | 455/56.1 |
| 5,365,516 | 11/1994 | Jandrell | 370/18 |
| 5,369,684 | 11/1994 | Buhl et al. | 455/33.1 |
| 5,390,234 | 2/1995 | Bar-Noy et al. | 379/59 |
| 5,432,841 | 7/1995 | Rimer | 379/59 |

OTHER PUBLICATIONS

W. Weib and M. Wizgall, "System 900: The ISDN Approach to Cellular Mobile Radio," Electrical Communication, vol. 64, No. 4, 1989.

Chestnut, Paul C., "Emitter Location Accuracy Using TDOA and Differential Doppler," IEEE, vol. 18, No. 2, Mar. 1982.

Sennott, J. W. et al., "A High Performance Position Tracker for Embedded Paging, Cellular Telephone, and Law Enforcement Applications," IEEE 1992 pp. 96–103.

Smith, William W., "Passive location of Mobile Cellular Telephone Terminals," IEEE, 1991, pp. 221–225 p. 223 is missing.

Harold Staras "The Accuracy of Vehicle Location by Trilateration in a Dense Urban Environment," IEEE Transactions on Vehicular Technology, vol. VT–21, No. 1, Feb. 1972.

George L. Turin, "Simulation of Urban Vehicle–Monitoring Systems," IEEE Transactions on Vehicular Technology, vol. VT–21, No. 1, Feb. 1972.

George L. Turin, "A Statistical Model of Urban Multipath Propagation," IEEE Transactions on Vehicular Technology, vol. VT–21, No. 1, Feb. 1972.

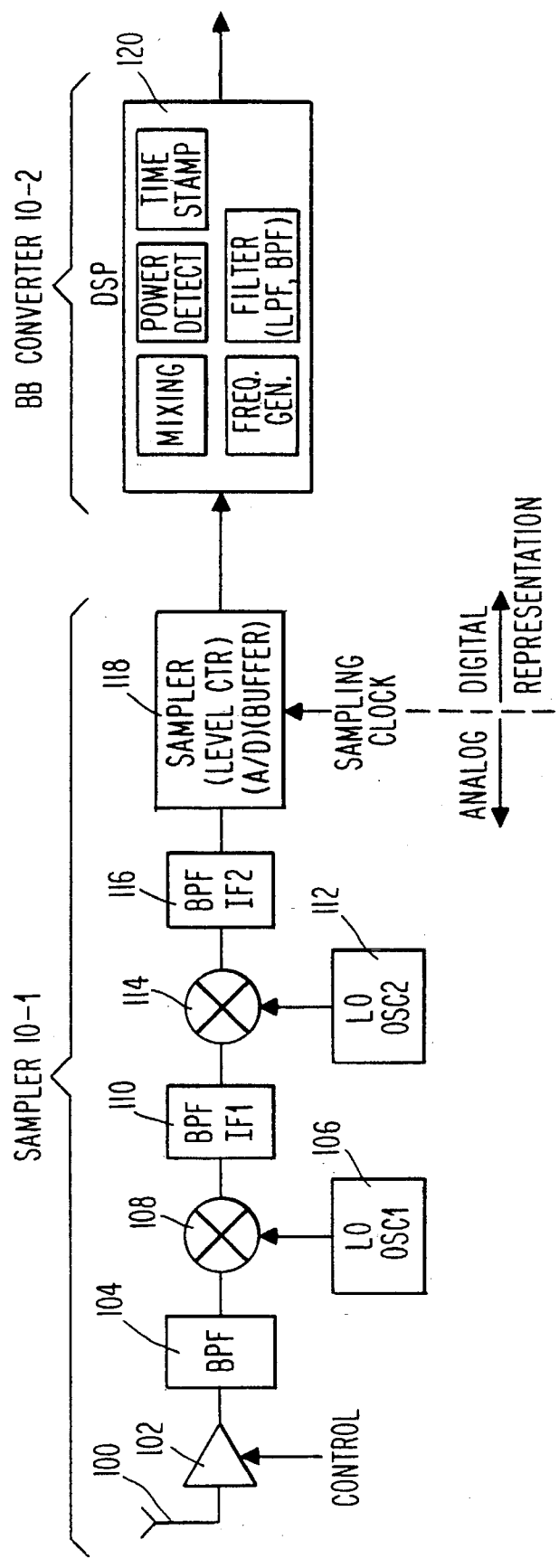
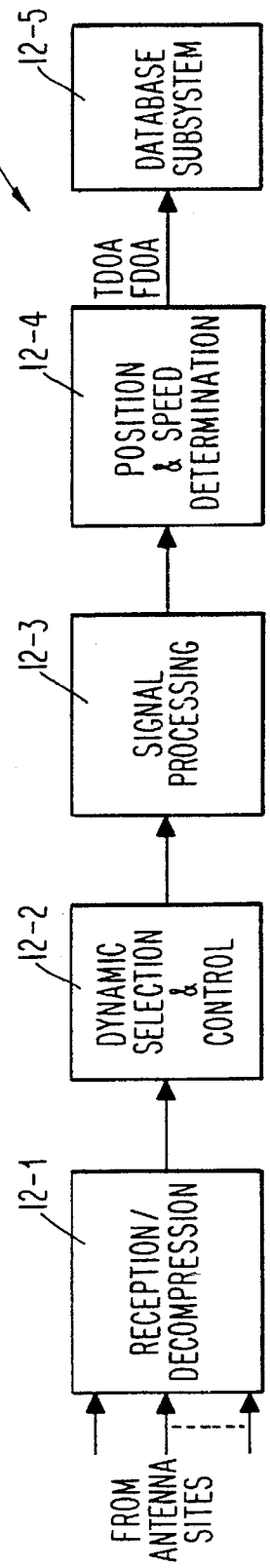
*Fig. 3*
*Fig. 4*

SYSTEM FOR LOCATING A SOURCE OF BURSTY TRANSMISSIONS CROSS REFERENCE TO RELATED APPLICATIONS

CROSS REFERENCE TO RELATED APPLICATION

This is a continuation-in-part of U.S. patent application Ser. No. 08/059,248, filed May 7, 1993, now U.S. Pat. No. 5,327,144 titled "Cellular Telephone Location System."

FIELD OF THE INVENTION

The present invention relates generally to methods and apparatus for locating the source of a radio transmission. More particularly, the present invention relates to a system for locating a transmitter that transmits and receives "bursty" messages having a duration on the order of a few seconds or less, and often a few hundred milliseconds or less. Specific embodiments of the present invention may be used to locate transmitters used in analog or digital cellular systems, personal communication networks (PCNs), enhanced specialized mobile radios (ESMRs), cellular digital packet data (CDPD) networks, and two-way packet-based data networks, such as RAM Mobile Data and Ardis networks. Although such transmitters employ different signal structures and operate in different frequency bands as assigned by the Federal Communications Commission (FCC), the invention disclosed herein may be practiced in connection with any of these transmitters and with international variants thereof.

BACKGROUND OF THE INVENTION

Preferred embodiments of the present invention may be used to locate the standard transmitters used in a variety of communications networks. A "standard" transmitter is one which is generally used in the network and has not been specially designed or modified to make it easier to locate. For example, standard transmitters of the type mentioned above share two common characteristics.

First, they are intended to be mass marketed and thus inexpensive. To this end, they employ low cost transmitter and receiver circuitry. Such mass marketable transmitters are distinguished from more expensive transmitters designed specifically for use with a locating system. An example of the latter is disclosed in U.S. Pat. No. 5,218,618, Jun. 8, 1993, titled "Cellular Telephone Service Using Spread Spectrum Transmission," which discloses a system employing a special type of spread spectrum transmitter to be deployed in vehicles.

Second, each of the transmitters mentioned above employs a messaging channel that carries a bursty data transmission (as distinguished from a voice transmission or a circuit switch data transmission). The expression "messaging channel," as used herein, refers to one or more radio channels carrying two way communications between a first and a second radio transmitter (where either the first or the second radio transmitter is the transmitter to be located), wherein the communications include (1) commands and responses between the first and the second transmitters; and (2) information identifying at least one of the first and second transmitters. For example, a cellular telephone system's control channels are examples of "messaging channels." A CDPD system is a messaging system overlaid on a cellular system. Thus, the portion(s) of a cellular system's spectrum normally assigned to voice conversations may also be considered a messaging channel when carrying CDPD data packet transmissions. For further background on the present invention, the reader is referred to the above-cited U.S. patent application Ser. No. 08/059,248. In addition, reference may be made to U.S. patent application Ser. No. 08/105,506, filed Aug. 11, 1993, "Methods and Apparatus for Increasing the Efficiency of a Cellular Telephone Location System."

SUMMARY OF THE INVENTION

One goal of the present invention is to provide a system capable of locating the source of bursty transmissions, as opposed to continuous transmissions of the kind associated with voice conversations. Systems that require a continuous transmission, such as a voice channel transmission or a so-called circuit switch data transmission, require the extended use of expensive radio channel capacity, and are not practical. A further goal of the present invention is to provide a system capable of locating a standard transmitter that has not been specially designed or altered to provide signals making the transmitter easy to locate. The present invention achieves these goals by applying the invention disclosed in U.S. patent application Ser. No. 08/059,248 to the location of standard transmitting devices that are similar but not necessarily limited to cellular telephones. Generally, the invention achieves these goals by processing the brief, bursty transmissions normally transmitted at periodic intervals or in response to a message signal (e.g., a page). Typically, the bursty response contains information about the identity of the responding transmitter.

One exemplary application of the present invention involves locating packages in transit, wherein the packages carry a small transmitting device like a cellular telephone but not capable of voice communication. In this example, the transmitter would only receive pages and respond by transmitting a signal identifying itself and/or the package in transit with which it is associated. The transmitter could be a cellular telephone whose voice capability is not used, a PCN transmitter whose voice capability is not used, or a CDPD device designed for data transmission.

In sum, the present invention provides a process and a system for determining the location of a "standard" mobile transmitter not specifically designed or altered to provide signals facilitating the location of the transmitter. In one preferred embodiment of the invention, the standard mobile transmitter is operative to receive a message signal and to respond to the message signal by transmitting a bursty responsive transmission indicative of the identity of the standard mobile transmitter. The inventive process comprises the steps of receiving the bursty responsive transmission from the standard mobile transmitter at (at least) first, second, and third antenna sites; digitalizing the received bursty responsive transmission at each of the antenna sites; determining first, second, and third time differences of arrival; and estimating the location of the standard mobile transmitter on the basis of at least the time differences of arrival. The first time difference of arrival represents a difference between the time of arrival of the responsive transmission at the first and second antenna sites. Similarly, the second time difference of arrival represents a difference between the time of arrival of the responsive transmission at the first and third antenna sites, and the third time difference of arrival represents a difference between the time of arrival of the responsive transmission at the second and third antenna sites.

In presently preferred embodiments, the standard mobile transmitter is a cellular telephone transmitter, a personal communication network (PCN) transmitter, an enhanced specialized mobile radio (ESMR) transmitter, a cellular digital packet data (CDPD) transmitter, or a two-way packet-based data transmitter. Furthermore, in preferred embodiments the bursty responsive transmission is received over a messaging channel, which may be, e.g., a control channel of a cellular system.

Those skilled in the art will recognize that extremely difficult technological challenges must be overcome in developing a practical process and system for locating a standard mobile transmitter on the basis of bursty transmissions. For example, these challenges relate to the difficulties involved in receiving bursty transmissions and separating these transmissions from each other and from other electromagnetic interference, including interference resulting from multipath. Moreover, the problems involved in identifying the times of arrival of a particular transmission at the respective antenna sites are great. Disclosed herein are a variety of inventive signal processing techniques for overcoming these problems. For example, in presently preferred embodiments, the step of estimating the position of the mobile transmitter comprises making a coarse estimate by creating a grid of possible latitude and longitude positions for each antenna site pair; calculating theoretical time difference of arrival values for pairs of antenna sites; determining a function of a sum of squares of the measured time differences of arrival minus the computed time differences of arrival; and coarsely estimating the position as the point at which the function of the sum of squares is a minimum. The coarse estimation step preferably includes deriving quality factors representing the quality of the signal received at the antenna sites of the pairs. In one preferred embodiment, the step involving determining a function of the sum of squares includes weighting the squares of the measured time differences of arrival minus the computed time differences of arrival by the quality factor. In addition, preferred embodiments include providing a confidence interval along with the location estimate. The confidence interval defines an area around the estimated location in which there is a probability the mobile transmitter is located.

In addition, preferred embodiments comprise the steps of determining first, second, and third frequency differences of arrival; and estimating the velocity of the standard mobile transmitter on the basis of at least the frequency differences of arrival. In presently preferred embodiments, the step of estimating the velocity of the mobile transmitter comprises making a coarse estimate by creating a grid or table of possible velocities; calculating, for pairs of antenna sites, theoretical frequency difference of arrival values corresponding to the possible velocities; determining a function of a sum of squares of the measured frequency differences of arrival minus the computed frequency differences of arrival; and coarsely estimating the velocity as the velocity at which the function of the sum of squares is a minimum.

Preferred embodiments also include generating a timing signal at each antenna site and using the timing signal as a reference in determining the time differences of arrival. The generation of the timing signal may include the steps of receiving a global positioning system (GPS) signal and generating a timing signal which is phase locked to the GPS signal. Alternatively, the generation of the timing signal may include the steps of transmitting a modulated carrier from a central site. The modulated carrier preferably has a carrier frequency near the frequency of the responsive signal. This embodiment also involves receiving the modulated carrier at each of the antenna sites and using the modulated carrier as a reference signal for the generation of the timing signal. The modulation of the modulated carrier transmitted from the central site preferably comprises a repetitive bit sequence having a repetition period greater than the greatest time difference of arrival expected to be encountered. For example, the modulation may include a pseudorandom bit sequence having a repetition rate greater than the greatest timing delay or time difference of arrival expected to be encountered.

In a presently preferred embodiment, the generation of the timing signal includes the steps of transmitting a reference signal from a plurality of reference transmitters, with each reference transmitter being visible to a corresponding pair of antenna sites. The reference signals are received at the respective antenna sites of each pair and used at each antenna site in each pair in generating a timing signal having a frequency and phase matched to the frequency and phase of the timing signal of the other antenna site in that pair. Preferably, the timing signal at each antenna site is an oscillating digital signal and is mixed with the digitalized responsive transmission or a downconverted version thereof to produce a baseband signal.

In preferred embodiments, the reception and processing of the responsive signal at each antenna site comprises receiving the responsive signal with an antenna array at each antenna site, and providing a high quality signal (preferably, a single high quality signal) for further processing. The step of providing a high quality signal comprises sampling a signal from each antenna in the array and formatting the samples into frames of digital data. On the basis of the frames of data, a high quality digital baseband signal is provided for further processing. Preferably, the process also includes determining whether the respective signals received via the antennas of the array contain a prescribed level of energy, and only providing a baseband signal for those signals having the prescribed level of energy or greater. In preferred embodiments, each data frame comprises a prescribed number of data bits and time stamp bits that represent the time at which the responsive signal was received. Furthermore, the high quality baseband signals are preferably provided at the respective antenna sites by coherently combining multiple baseband signals so as to reduce the effects of multipath. Preferred embodiments reduce the effects of multipath at each antenna by detecting a first leading edge of the responsive signal and rejecting subsequent leading edges of the responsive signal.

One presently preferred embodiment of the invention includes the steps of: (1) generating a substantially unimpaired representation of the baseband signal by remodulating the demodulated signal; (2) determining which antenna in the array likely received the transmission over the shortest and most direct path; (3) performing a correlation between the generated, unimpaired representation of the signal and each of the signals received through each of the antennas, and generating a correlation output function for each signal; (4) determining the relative amount of multipath impairment that may have occurred at each antenna by measuring the width of each correlation output function at a predefined point on the correlation output function; (5) coherently combining the signals that appear to have similar multipath impairments to increase the quality of the signal representation; and (6) estimating a quality factor that is indicative of the relative amount of impairment that will remain in the signal after processing.

Preferred embodiments also include extracting selected signal characteristics from the high quality baseband signal; compressing the high quality baseband signal so as to retain the selected characteristics; and forwarding the compressed signal to a prescribed location for further processing. The selected characteristics preferably include timing, power, frequency, phase, and a factor representing the quality of the baseband signal.

In presently preferred embodiments of the invention, the time and frequency differences of arrival are determined simultaneously using a maximum likelihood estimator. For example, the maximum likelihood estimator preferably involves finding the peak of a function $R_{x_1x_2}$ defined as, $$R_{x_1x_2}(\tau,\Omega) = \left| \int_{-\infty}^{\infty} X_1(t-\tau) X_2^*(t) e^{-i\Omega t} dt \right|$$

where $X_1(t)$ and $X_2(t)$ are the complex envelopes of the signals received at the respective antenna sites of a pair, $\tau$ represents the delay, $\Omega$ represents Doppler shift, t represents time, and $\omega_o$ represents the frequency of the responsive signal. The function $R_{x_1x_2}$ defines a three-dimensional surface having a peak at a point where $\tau$ equals the time difference of arrival (TDOA) and $\Omega$ equals the frequency difference of arrival (FDOA). Thus, the TDOA and FDOA are determined simultaneously by finding the peak of $R_{x_1x_2}$. Preferred embodiments also employ the maximum likelihood estimator to estimate and correct for chirp.

In addition, preferred embodiments demodulate the responsive signal received at each antenna site, determine the identification of the mobile transmitter, and, on the basis of the identification, decide whether to further process or discard the responsive signal. Preferably, a table indicating which transmitters are to be located and which transmitters are not to be located is stored in a database. Thus, the location system may be implemented such that only subscribers to the system will be located.

The location estimation process also preferably involves dynamically selecting the best data from all data generated by processing data from the antenna site pairs. Preferably, the dynamic selection involves creating a table with data from all available antenna site pairs and then ranking the antenna site pairs in accordance with appropriate criteria. Preferred embodiments determine identification bits, a channel number, and a time stamp for a signal obtained at each antenna site, and the dynamic selection comprises dynamically organizing the data according to the identification bits, channel number, and time stamp.

Presently preferred embodiments of the invention include storing location, velocity, and identification information in a remotely and locally accessible database. Preferably, the database allows storing, sorting, purging, and archiving of the information. Preferred embodiments also include preventing unauthorized access to the location and identification information in the database. The data in the database may also be transformed into formats compatible with other applications, e.g., an electronic mapping application.

Preferred embodiments of the invention also include performing a calibration involving receiving, at multiple antenna sites, signals from a reference transmitter at a known location. Measurements are then performed among pairs of antenna sites to determine systemic errors that may exist. Preferably, the calibration produces a site bias for use in location and speed calculations.

Preferred embodiments may also include performing the following functions:

(1) Merging the location data with billing data for the mobile transmitter, and generating modified billing data. In these embodiments, the billing data indicates the cost for each transmission made by the transmitter within a certain time period, the cost being based upon one or more predetermined billing rates. The modified billing data is based upon a different rate for calls made from one or more prescribed locations.

(2) Transmitting a signal to a selected mobile transmitter to cause the selected transmitter to transmit, thus allowing the system to locate the transmitter at any time (unless it is turned off).

(3) Automatically sending location information to a prescribed receiving station in response to receiving a distress signal from a mobile transmitter. This function allows emergency assistance to be provided to a subscriber in distress.

(4) Comparing the current location of a given mobile transmitter with a prescribed range of locations and indicating an alarm condition when the current location is not within the prescribed range.

(5) Detecting a lack of signal transmissions by a given mobile transmitter and in response thereto automatically paging the given transmitter to cause the given transmitter to initiate a transmission. Alternatively, instead of or in addition to paging the transmitter, an alarm condition may be communicated so that appropriate action can be taken.

(6) Estimating a time of arrival of a given transmitter at a prespecified location.

(7) Locating an object or person carrying a mobile transmitter.

(8) Determining whether the estimated location is a feasible location and, if not feasible, setting or "snapping" the estimated location to the nearest feasible location.

(9) Determining a feasible location area, or "Virtual Location Area," for the mobile transmitter and sending messages to the transmitter only from antenna sites covering the Virtual Location Area.

Another embodiment of the present invention provides a system for determining the location of a "standard" mobile transmitter, wherein the system comprises at least three antenna site systems, a central site system, and means for determining the location of the mobile transmitter on the basis of the times of arrival differences. In this embodiment, the antenna site systems include an antenna or antenna array; a sampling subsystem for sampling the bursty responsive signal and formatting the sampled signal into frames of digital data, with each frame comprising data bits and time stamp bits; a baseband convertor providing baseband signals derived from the frames of data; and a timing subsystem. In presently preferred embodiments, the central site system comprises a maximum likelihood estimator for determining time differences of arrival and frequency differences of arrival. Preferred embodiments also include location estimation means for creating a grid of theoretical points covering a prescribed geographic area; calculating theoretical values of time delay for a plurality of pairs of antenna sites; calculating a least squares difference value based on the theoretical time delays and measured time delays for a plurality of pairs of antenna sites; searching the entire grid of theoretical points and determining the best theoretical latitude and longitude for which the value of the least squares difference is minimized; and starting at the best theoretical latitude and longitude, performing another linearized-weighted-least-squares iteration to resolve the actual latitude and longitude to within a prescribed number of degrees or fraction of a degree. The step of calculating theoretical values of time delay preferably accounts for any known site biases caused by mechanical, electrical, or environmental factors, where the site biases may be determined by periodically calculating the positions of reference transmitters at known locations.

Another embodiment of the invention provides a method for determining the location of a mobile transmitter transmitting a responsive signal over a predefined "messaging" channel. The responsive signal is preferably indicative of the identity of the mobile transmitter. The method includes the steps of receiving the signal at least three separate ground-based antenna sites; processing the signal at each antenna site to produce frames of data; processing the frames of data to identify the responsive signal and the differences in times of arrival of the responsive signal among the antenna sites; and determining, on the basis of the times of arrival differences, the location of the mobile transmitter. Other features of the present invention are described below.

BRIEF DESCRIPTION OF THE DRAWINGS

FIG. 3 is a more detailed diagram of a portion of the antenna site system.

FIG. 4 is a block diagram of one preferred embodiment of a central site system in accordance with the present invention.

DETAILED DESCRIPTION OF PREFERRED EMBODIMENTS

I. Overview of Location System

Figure 1:
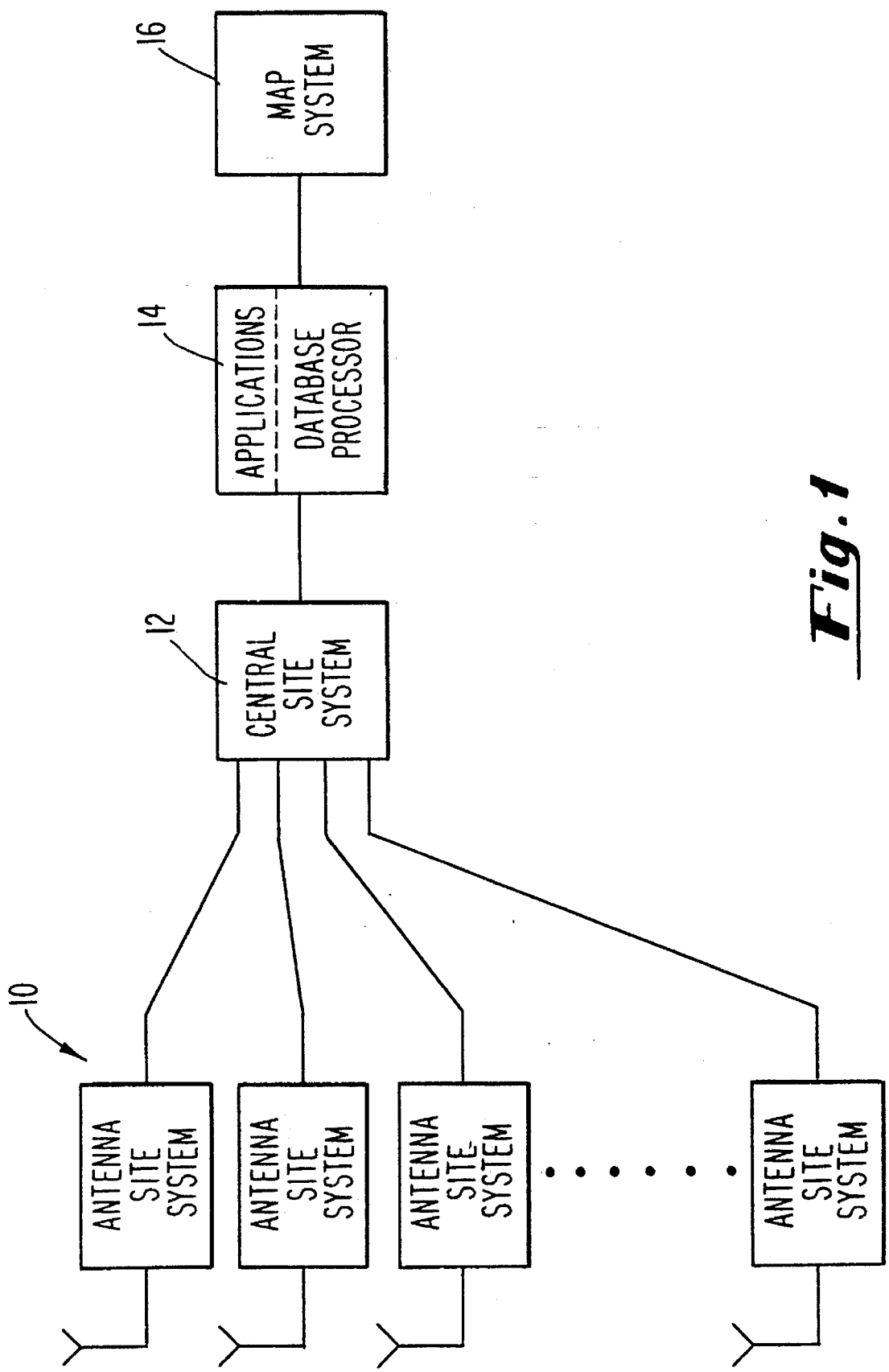
FIG. 1 is a schematic diagram of a mobile transmitter location system in accordance with the present invention.

As described above, the present invention provides a system for determining the location of a mobile transmitter operative to receive a message signal and to respond to the message signal by transmitting a responsive signal (e.g., over a predefined message channel), wherein the responsive signal is indicative of the identity of the mobile transmitter. As shown in FIG. 1, one presently preferred embodiment of the invention comprises at least three antenna site systems 10, a central site system 12, a database processor for use in connection with various applications (discussed below), and a map system 16. The antenna site systems 10 may be collocated with cellular system cell sites, although this is not a requirement. For example, the antenna site systems may be positioned on top of a building or tower where no other cellular equipment resides. As discussed above, the invention may be employed to locate cellular telephones and/or like devices emitting bursty transmissions, e.g., over messaging or control channels.

Preferred embodiments of the invention make significant use of digital signal processing techniques. These techniques entail the use of appropriate forms of sampling and conversion hardware to convert analog radio frequency signals into sampled digital data forms. These techniques are widely known in the art, and are capable of performing many functions traditionally implemented using analog components. The advantage of using digital signal processing include better control of noise during conversion, sampling, and filtering; and exact replication of these functions from antenna site to antenna site. With analog components, variability of the components, even within tolerances, can cause different results at different antenna sites. Since many of the subsystems process digital forms of signals, it is technically immaterial whether many of the subsystems reside at one or more of the antenna site locations or instead reside at the central site location. Therefore, the combination of all antenna sites and the central site should be viewed as a network of signal processing capability. Moreover, one skilled in the art will recognize that it possible to rearrange certain subsystems so that some functions described as being part of an antenna site system may be moved to the central site system, and vice versa. Indeed, in a commercial implementation of a location system for a particular city, the actual location of subsystems is a cost tradeoff involving the cost of digital signal processing subsystems and the cost of communications facilities connecting the antenna sites and the central site.

II. Antenna Site Systems 10

Figure 2:
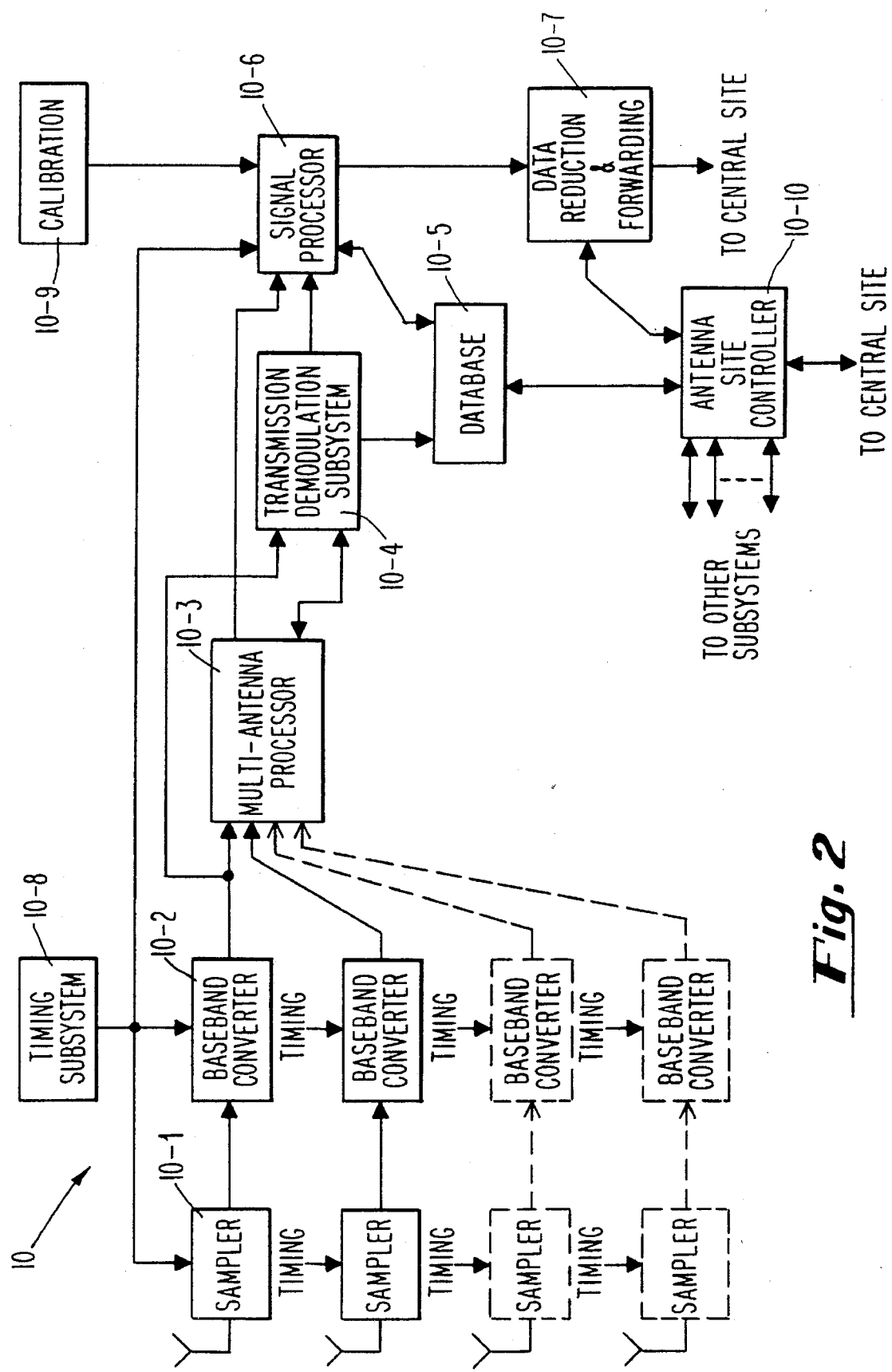
FIG. 2 is a block diagram of one preferred embodiment of an antenna site system in accordance with the present invention.

Referring to FIG. 2, each antenna site system 10 comprises an elevated ground-based antenna array for receiving the responsive signal "over the air" with an array of one or more antennas and allowing the antenna site system to select the signal with the highest quality for further processing. In addition, in preferred embodiments, each antenna site system includes two or four sampling subsystems 10-1 for sampling the responsive signal from each antenna at a prescribed sampling frequency using a prescribed sampling algorithm and formatting the sampled signals into frames of digital data. Each frame of data comprises a prescribed number of data bits and time stamp bits that represent the time at which the responsive signal was received. Two or four baseband convertors 10-2 receive the sampled signal and provide a baseband signal derived therefrom. A multi-antennae processing subsystem 10-3 combines and distinguishes the signals received from the individual antennas in the antenna array, and then provides a single representation of a signal for further processing. A demodulating subsystem 10-4 determines the demodulated data content of the responsive signal, where the demodulated data content may include information identifying the mobile transmitter and other user data conveyed in the responsive transmission. A database subsystem 10-5 determines how and whether a responsive signal should be further processed, or whether it should be discarded. A signal processing subsystem 10-6 extracts selected signal characteristics from the frames of digital data, such as timing, power, frequency and phase. A data reduction and forwarding subsystem 10-7 selects and compresses the data frames before transmission over communications facilities to the central site 12 (FIG. 1). A timing subsystem 10-8 determines a timing signal common to all antenna site systems. A calibration subsystem 10-9 performs self-calibration on the antenna site system to determine and correct systemic changes in delay, frequency, and phase of the various antenna site components. Finally, an antenna site controller 10-10 exchanges commands with each subsystem in the antenna site and the central site, and controls the operation of the entire antenna site system. The components/subsystems of the antenna site system are described in greater detail below.

Antenna Array

In presently preferred embodiments of the invention, the elevated antenna array located at each antenna site includes an array of two or four antennas mounted on an elevated platform, such as a tower or an appropriate point on a building, where each antenna is suitable for receiving the responsive transmissions. Omnidirectional antennas are preferred, since they permit each antenna site system to receive signals from the widest possible area. However, directional antennas will also work, although their visibility is limited. The antennas are preferably high-gain antennas since the location system benefits from having as many antenna site systems as possible viewing a particular transmission. A high gain antenna mounted on a tower can be expected to detect transmissions at distances of greater than 35 miles. It may also be possible to employ existing antennas, such as the existing cellular omnidirectional antennas at a cell site.

A preferred antenna array has two antennas located in the same horizontal plane or four antennas with two in the same vertical plane and two in the same horizontal plane (arranged as a cross). In either configuration, the antennas are spaced at a distance from each other that is greater than one wavelength of the carrier frequency of interest. (For example, if the system is to detect cellular transmissions, then the carrier frequency would be near 834 MHz and the wavelength would be about 35.97 centimeters.) If costs do not permit the use of multiple antennas at each antenna site, the antenna site systems, or a subset of the antenna site systems, may be constructed with one antenna, although there would be a degradation in the ability of the system to reject multipath. Multipath is an impairment whereby multiple copies of a single transmission are received at the antenna site, where each copy of the transmission has traversed a different path from the originating transmitter to the antenna.

The purpose of an antenna array is to provide horizontal and/or vertical antenna diversity at each antenna site subsystem. The responsive signal transmissions that the location system detects and processes are subject to degradation from multipath and other interference. With multiple antennas, the multi-antennae processing subsystem 10-3 measures the signal characteristics of the responsive signal received by each of the antennas at the antenna site. The multi-antennae processing subsystem compares each of the measured signal characteristics, selects the signal with the best characteristics, and routes this signal to the transmission demodulation subsystem 10-4 and signal processing subsystem 10-6.

Sampling Subsystem 10-1

Each sampling subsystem 10-1 is responsible for converting a responsive signal from its analog or RF state into a digital state at a particular intermediate frequency (IF) using a prescribed sequence of steps. The digitalized signals are represented by frames of digital data. For example, for a cellular transmitter, this may involve conversion from a carrier frequency of approximately 834 MHz down to approximately 2 MHz. The sampling and baseband convertor sections 10-1, 10-2 are especially important because of the need to preserve the integrity of the responsive signal throughout the down conversion process without introducing additional noise or causing other degradation or deterioration.

In considering the importance of the sampling and baseband convertor sections, the narrowband nature of the signals involved should be noted. For example, typical cellular transmissions, whether related to analog or digital voice cellular, CDPD, or the like, are channelized into discrete channels of varying widths. For many cellular transmitters, the messaging channel transmissions use a reverse control channel, with all transmissions occurring in one of 21 consecutive channels, each 30 kHz wide. Mathematical studies of the nature of RF signals demonstrate that narrowband signals are more susceptible to noise than wideband signals, especially with respect to accurate timing of the signals. In preferred embodiments of the present invention, the sampling and baseband convertor subsystems are designed to work under the worst case scenario of many adjacent channels.

Referring to FIG. 3, one preferred embodiment of a sampling subsystem 10-1 comprises a connection to an antenna 100 in the antenna array; a software-controlled, variable amplifier 102 of sufficient gain to compensate for cable loss and other communication channel losses; a first low delay bandpass filter 104 with a bandwidth covering the full expected transmission range of the mobile transmitters (if these are cellular telephones, the bandwidth would be 21 channels×30 kHz per channel=630 kHz); a first high stability, high accuracy crystal oscillator (OSC1) 106 and a mixer 108 for transforming the RF signal down to a first intermediate frequency IF1; a second low delay bandpass filter 110 with a bandwidth similar to the first filter 104; a second high stability, high accuracy crystal oscillator 112 (OSC2) and a mixer 114 for transforming the first intermediate frequency IF1 to a second intermediate frequency IF2; a third low delay bandpass filter 116 with a bandwidth similar to the first filter 104; and a sampling circuit 118. The intermediate frequencies IF1 and IF2 are selected so that, through both stages of mixing and bandpass filtering, no alias of the original signal is created at or near the intermediate frequencies IF1 and IF2. Any aliases should appear far enough away such that inexpensive bandpass filters can be used. The second intermediate frequency IF2 should be chosen such that the sampling circuit 118 can be built with a readily available analog to digital convertor (A/D) that has a sufficient dynamic range to adequately sample the signal. For cellular signals, the dynamic range should be greater than about 80 dB.

The sampling circuit 118 comprises three main components (not shown): (1) a software controlled, variable gain amplifier used to adjust the level of the signal; (2) an analog to digital convertor that samples the second intermediate frequency IF2 at a prescribed sampling clock frequency S1 using a prescribed number of sampling bits; and (3) a digital buffer capable of temporarily storing the data bits output by the A/D convertor before these bits are forwarded to the baseband convertor 10-2. As mentioned, the A/D convertor should have a sufficient dynamic range to adequately sample the signal over its full expected signal level. The sampling frequency S1 should be much greater than the Nyquist rate (2×IF2) plus the bandwidth of the signal. For example, the frequencies used in connection with a cellular system might be a second intermediate frequency IF2 of 2 MHz and signal bandwidth of 630 kHz. For such a system, S1 should be much greater than 4.63 MHz. At the completion of the sampling process, the signal is fully represented in a digital form. All further processing in all other subsystems takes place digitally and, therefore, uniformly across all antenna site locations.

Baseband Convertor 10-2

Each baseband convertor subsystem 10-2 is responsible for sequentially extracting and outputting a single baseband representation of a transmission received over one of the narrowband channels by the antenna site system. Each antenna site system preferably has two or four baseband convertor subsystems, each being connected to its own antenna in the antenna array, through its own sampling subsystem 10-1. With this configuration, each baseband convertor extracts a baseband representation of a transmission as received by a single antenna. Later, the transmissions from the separate baseband convertors are compared and combined.

The baseband convertors 10-2 may be implemented with digital signal processing technology to improve the noise performance of the system, and to improve filter characteristic matching from one antenna site system to another. In other words, it is desirable for the amplifier/filter sections to be matched with minimal variability between antenna site systems.

Referring to FIG. 3, presently preferred embodiments of the baseband convertors comprise a digital signal processing subsystem 120 and software that emulates various functions traditionally implemented using hardware components. Specifically, the following functions are performed:

(1) the generation of complex signals including the sine and cosine (in phase and quadrature) versions of a specific frequency, said signals being generated for the purpose of mixing the digitally sampled signals;

(2) the mixing of the digitally generated complex signals with the digitally sampled transmissions received from the sampling subsystem 10-1 to generate further intermediate signals and complex baseband signals that represent only a single channel;

(3) the lowpass and bandpass filtering of the mixed signals, using an appropriate bandwidth and filter characteristic to remove unwanted signal components that result from mixing;

(4) the performance of fast fourier transforms to detect the presence or absence of power in each of the channels in which transmissions may occur; and (5) the coding of the digital bits to convey timing and channel information to further processes within the antenna site system and the central site system.

The following example illustrates the processing that might take place within the baseband convertor 10-2 to extract a single cellular transmission occurring on reverse control channel number 8. First, the baseband convertor subsystem 10-2 receives a 100 millisecond segment of digital bits from the sampling subsystem 10-1. The 100 millisecond segment represents 630 kHz of signal bandwidth at the intermediate frequency IF2. The baseband convertor digitally generates a complex sinusoid OSC3, centered at frequency IF2, and then digitally mixes OSC3 with the signal received from the sampling subsystem. After mixing, the resultant signal is appropriately bandpass filtered. This mixing generates a baseband signal, at a frequency IF3, containing all 21 reverse control channels, each with a bandwidth 30 kHz. This baseband signal is digitally stored because recursive processing may be needed in the following stages for simultaneous transmissions and each stage of processing should begin with the unaltered representation of the baseband signal. The baseband convertor subsystem 10-2 then performs a fast fourier transform (FFT) on each of the channels to detect whether a transmission occurred during the time interval represented by the digital bits currently being processed. In this example, the baseband convertor may detect energy in channel number 8, and possibly other channels, and decide to further process channel number 8. The baseband convertor digitally generates a complex sinusoid OSC(ch8), and then digitally mixes OSC(ch8) with the baseband signal at IF3. This mixing, in combination with digital filtering similar to that performed in earlier stages and decimation of the samples, converts the reverse control channel signal to a signal having a bandwidth of 30 kHz and centered at 0 Hz. This final signal is represented by a set of digital bits of length (T * R * S), where T is the transmission length of the message, R is the sampling rate of a single channel's baseband signal, and S is the sampling resolution of the sampling subsystem. In this example, T is 100 milliseconds, R is 60 kHz or more, and S is 16 bits. Therefore, in this example, the baseband convertor outputs 96 kbits plus the time stamp and channel identification bits to further processing stages in the antenna site system and central site system. If the sampling rate R were greater than the Nyquist rate of 60 kHz, the number of bits output would also be greater. If the FFT had detected energy in other channels, say channels 11 and 23, the baseband convertor would similarly process these channels and output a similar set of 96 kbits.

The signals OSC3 and OSC(ch8) are digitally generated by the digital signal processing subsystem 120, and therefore may be at any desired frequency. As discussed below, one preferred implementation of the timing subsystem 10-8 (FIG. 1) involves the calculation of frequency and phase errors between timing sources at pairs of antenna site systems. The baseband convertor subsystem 10-2 calculates the exact frequency and phase of OSC3 and OSC(ch8) by using nominal starting values and then using adjustments supplied by the timing subsystem.

Multi-Antennae Processing Subsystem 10-3

The multi-antennae processing subsystem 10-3 (FIG. 2) is responsible for combining and distinguishing the digital representations of a single responsive transmission as received by either two or four baseband convertor subsystems 10-1. The reader is reminded that RF transmissions typically reflect off of many surfaces, such as hills and mountains, buildings, metal structures, automobiles and trucks, etc. Because of such reflections, a single transmission may be received at a particular antenna multiple times. This phenomenon is known as multipath. Each copy of the transmission will likely have taken a different path. Greater path lengths result in greater transmission times. For example, if a single transmission takes three transmission paths of lengths L1, L2, and L3, where L3>L2>L1, the transmission or propagation times T1, T2, and T3 will exhibit the relationship, T3>T2>T1. However, the relationship between power levels of the three signals as received at an antenna P1, P2, and P3 will be indeterminable. One cannot even assume the relation P1>P2>P3, although this may frequently be the case. The exact amount of multipath impairment cannot be exactly determined from the received signal. However, the amount of signal impairment can be estimated from the change in the width of the received signal from its estimated original transmitted state, and from variations in the envelope of the received signal. Moreover, it is known that the envelope of a transmitted cellular signal is constant.

The antenna array is constructed with two or four antennas spaced at distances greater than one wavelength because it can be shown that the RF propagation paths can be very different at positions separated by one wavelength or greater. The separation of a set of antennas designed to receive the same signal is known as "antenna diversity." In preferred embodiments of the present invention, the antenna array associated with each antenna site system incorporates both horizontal and vertical antenna diversity. Each of the antennas receives the responsive transmission via a different path. These responsive transmissions, which may be impaired differently by the effects of multipath or other aberrations, are separately processed by separate sampling subsystems 10-1 and separate baseband convertor subsystems 10-2. These subsystems receive a common clock from the timing subsystem 10-8. Any differences in electrical path length from the timing subsystem to the respective subsystems receiving the clock are compensated (e.g., in the digital signal processor 120) to substantially eliminate any variability among the processing performed by the subsystems. Each baseband convertor subsystem 10-2 then forwards its digital representation of a single transmission to the multi-antennae processing subsystem 10-3, which combines the two or four representations of the transmission into a single representation, with the maximum amount of multi-path and other impairments removed from the signal.

The multi-antennae processing subsystem 10-3 performs the following functions using digital signal processing subsystems, taking into account the exact relative physical locations of the mounted antennas at the antenna site:

(1) the demodulated data bits received from the transmission demodulator subsystem 10-4 are remodulated at baseband so that an unimpaired representation of the signal is generated;

(2) the relative time of arrival of the leading edges of each of the received transmissions is measured to determine which antenna likely received the transmission over the shortest and most direct path;

(3) a correlation is performed between the generated, unimpaired representation of the signal and each of the signals received through each of the antennas;

(4) the width of the correlation output function is measured at a predefined point on the correlation output function to determine the relative amount of multipath impairment that may have occurred at each antenna;

(5) the signals that appear to have exact or very similar multipath impairments are coherently combined to increase the quality of the signal representation for later processing stages;

(6) a quality factor that is indicative of the relative amount of impairment that will remain in the signal after processing is estimated, the quality factor being akin to a statistical confidence interval measure that will later be used in the final location calculation; and (7) a single signal representation is output to the signal processing subsystem 10-6.

The preferred characteristics of the single representation provided to the signal processing subsystem 10-6 are: (a) it represents a coherent combination of signals where possible; (b) envelope variations have been removed; (c) phase and frequency have been faithfully maintained, and (d) the timing bits reflect the measurement of the leading edge of the responsive signal at the antenna array.

Transmission Demodulation Subsystem 10-4

The transmission demodulation subsystem 10-4 uses a digital signal processing subsystem to demodulate the responsive transmission at baseband. The demodulation technique used is selected based upon the modulation used for the responsive transmission. For example, the reverse control channel of a cellular telephone is a 10 kbits per second data stream that is first Manchester encoded and then modulated using frequency shift keying (FSK) at frequencies that are ±8 kHz around the center frequency of the channel. The transmission demodulation subsystem 10-4 uses the digital baseband representation of the responsive signal from one of the baseband convertors as its input, and then outputs the actual digital content of the message without modulation of any kind. For example, the reverse control channel transmission of a cellular telephone, which may have required 100 milliseconds to transmit and may require 100 kbits to represent at baseband, may be represented by approximately 100 bits after demodulation. The transmission demodulation subsystem forwards the data bits and an error count to the multi-antennae processing subsystem 10-3, the database subsystem 10-5, and the signal processing subsystem 10-6. The error count is Calculated based upon any known error control built into the modulation protocol and the demodulation of the received transmission. For example, some modulation schemes used by cellular telephones repeat the data bits multiple times to increase the likelihood of accurate reception. Other modulation schemes include parity bits or cyclical redundancy checks.

Database Subsystem 10-5

The functionality residing within the database subsystems 10-5 at the respective antenna site locations is shared with the database subsystem 12-5 (FIG. 4) residing at the central site 12. The database subsystems are primarily responsible for storing the identification numbers and appropriate security information, as well as other parameters about the transmitters in use in the geographic area covered by the location system. For example, in a system for locating cellular telephones, the database subsystems would store, for each cellular telephone in the geographic area served by the location system, the phone number (or Mobile Identification Number), the electronic serial number (ESN), and appropriate codes. The codes would identify specific location services and applications for which the phone has been subscribed. Exemplary applications of the invention are described below.

Each database subsystem 10-5 receives the responsive transmitter's demodulated data from the associated transmission demodulation subsystem 10-4. The database subsystem then extracts the transmitter's identification, security information, and other address information from the transmission, and uses that information to look up stored codes in the database to determine a further course of action for the received transmission. For example, codes in the database subsystem may indicate that the customer does not desire location services and the antenna site system may stop further processing of the transmission, thereby conserving processing resources. Other codes in the database subsystem may indicate that the transmission should be completely processed and forwarded to a particular application upon completion of processing. Other codes may indicate, for example, that, if a cellular telephone customer dials "911", the transmission should be processed regardless of whether the customer subscribes to location services and that the result of the processing should be forwarded to the appropriate "911" service center. It should be noted that different "911" emergency service centers may serve different cities, counties, or states, and that the database subsystem preferably determines where to send the location information. Other codes in the database subsystem may indicate whether the current transmission originated from a reference or calibration transmitter and, if so, the database subsystem may notify the appropriate subsystem as necessary.

Based upon the stored codes and the demodulated data, the database subsystem can direct further activities within the antenna site system 10. For example, in preferred embodiments of the invention, the database subsystem determines whether the multi-antennae processing subsystem 10-3, the signal processing subsystem 10-6, the timing subsystem 10-8, and the calibration subsystem 10-9 should continue processing the current transmission, or whether all representations of the responsive transmission should be discarded.

Signal Processing Subsystem 10-6

The functionality within the signal processing subsystem 10-6 at each antenna site location is shared with functionality within the signal processing subsystem 12-3 (FIG. 4) in the central site system 12. AS discussed above, the actual location of any specific software function and its corresponding digital signal processing subsystem hardware is an economic tradeoff and not a technical tradeoff. Therefore, the complete description of the signal processing is covered in the description (below) of the central site system.

Data Reduction and Forwarding Subsystem 10-7

The data reduction and forwarding subsystem 10-7 (FIG. 2) is responsible for receiving data frames from the signal processing subsystem 10-6 and the antenna site controller 10-10, compressing the data frames, and forwarding the data frames in an error free manner to the central site system 12 (FIG. 1). The compression of the data frames is accomplished with knowledge of the structure of the responsive transmissions and standard compression algorithms. For example, cellular transmitters transmit using a constant envelope. Therefore, amplitude information is redundant and may be stripped by the compression algorithm, leaving only phase information about the signal.

Each data frame will typically contain the following information:

(1) the demodulated bits of the responsive transmission and the error count;

(2) the time stamp bits indicating the time of arrival of the leading edge of the transmission;

(3) the calculated quality factor associated with the responsive transmission;

(4) the estimated power present in the signal transmission, as calculated by the FFT;

(5) the channel number in which the transmission was received, where the channel number is indicative of the received frequency prior to conversion to baseband; and (6) the digital representation of the responsive transmission.

Timing Subsystem 10-8

The timing subsystem 10-8 at each antenna site location is responsible for providing an accurate, stable timing source. A preferred timing subsystem can provide timing that is accurate to within 10 nanoseconds. That is, the time as measured by each antenna site system 10 deviates by no more than 10 nanoseconds from the time as measured by the other antenna site systems. The timing subsystem 10-8 provides a reference frequency that is used to lock the frequencies used to mix and sample the analog RF signal and convert the signal into a digital data format.

In one preferred embodiment, the timing subsystem includes a GPS receiver located at each antenna site location. The GPS receiver is preferably a differential receiver capable of correcting for changes in ionospheric or atmospheric conditions and GPS satellite movements. Preferably, the GPS receiver always outputs a pulse that is within 10 nanoseconds of a pulse that is output by another GPS receiver located at any of the other antenna site locations within a given system. The differential corrections may be accomplished through prior knowledge of the GPS satellite epherimides and current ionospheric conditions and by using standard algorithms to calculate corrections. Alternatively, the corrections may be accomplished through the transmission of a second signal such that the GPS receiver can discriminate and determine perturbations in the primary GPS signal versus the secondary signal and then calculate corrections.

At each antenna site location, a local oscillator that is both temperature controlled and voltage controlled is used to drive a phase locked loop. Within the phase locked loop, a pulse is created whose periodicity is the same as the pulse output by the GPS receiver. The phase locked loop then makes corrections to the oscillator to adjust the internally generated pulse until it coincides with the GPS created pulse. Phase locked loops will result in an oscillator output IF1 and IF2 whose frequency and phase are well controlled and locked at each of the antenna site locations and between antenna site locations.

In another embodiment, the timing subsystem includes a centrally located transmitter whose carrier frequency is near the carrier frequency of the responsive signal. The carrier frequency is modulated with a second signal whose structure is conducive to timing extraction at the various antenna site locations. Such a modulation signal could be a pseudorandom bit sequence whose repetition rate is much greater than the greatest timing delay expected in the geographic area encompassed by the location system. For example, if a location system were installed in a geographic area measuring 100 miles across at its greatest dimension, the maximum expected delay in the system would be 538 microseconds (100 miles/186,000 miles per second). If the pseudorandom sequence repeated over a period greater than this, such as one to two seconds, any receiver at an antenna site could unambiguously determine the time of arrival of a responsive signal relative to the nearest earlier start of the pseudorandom sequence. In this preferred embodiment, the centrally located transmitter transmits its signal continuously. Each antenna site receives the signal emitted by the centrally located transmitter using the same antenna and cabling used for receiving the responsive signal. This sharing of antenna and cabling causes atmospheric and environmental perturbations to act simultaneously on both the timing subsystem and the responsive signal, thereby cancelling out the effect of the common mode perturbation at that antenna site. The location of each antenna site is known relative to the central site, and therefore a known delay exists between the transmission of the timing signal at the central site and its reception at each antenna site. This known delay is applied during timing extraction such that the calculated time at each antenna site is within 10 nanoseconds of that at each other antenna site. In this embodiment, phase locked loops are employed in a manner similar to those used in the GPS based embodiment.

In a third and most preferred embodiment, the timing subsystem 10-8 includes a high stability, high accuracy, free running local oscillator at each antenna site location, and at least one reference transmitter situated in a geographic location visible to at least two of the antenna site systems 10. In this embodiment, any pair of antenna site locations should be able to see the same reference transmitter, but not all antenna site locations need to see the same reference transmitter. In a given system implementation, enough reference transmitters should be located throughout the covered area to meet the pairwise visibility guideline stated above. The reference transmitter is preferably similar to the transmitters located by the system. For example, it may simply be a cellular telephone or a CDPD unit. The advantage of using a similar reference transmitter is that the analog RF path taken by the reference transmitter would be identical to that taken by all other transmitters that are being located, and therefore common mode perturbations would be cancelled. The reference transmitter should be situated in a location that is open, visible, and minimizes multipath between the reference transmitter and antenna sites that the reference transmitter serves. In this embodiment, no corrections are made to the local oscillator itself. In other preferred embodiments, the use of phase locked loops accomplishes the phase locking by making phase adjustments to the local oscillator to correct the local oscillator's phase and frequency to match that of the timing source, such as the GPS receiver or the centrally located timing transmitter. The phase locking technique introduces the unwanted effect of adding new phase errors, or phase noise, to the phase errors that are already present in the free running oscillator.

In this embodiment, each antenna site system is at a known location relative to the reference transmitter. Therefore, the exact delay between the reference transmitter and the antenna site is known. The reference transmitter is known to be stationary and thus its Doppler shift is zero. Therefore, for each pair of antenna site locations that receives a signal from the reference transmitter, the relative frequency and phase drift of the local oscillator at one antenna site can be determined relative to the local oscillator at the second antenna site. This determination is accomplished by processing the reference transmitter signal exactly the same as the processing of a responsive signal from any other transmitter. If, during processing, a Doppler shift is found between any pair of antenna sites, then that Doppler shift must be due solely to the drift of the timing source at one antenna site relative to the timing source at the other antenna site. Because the oscillators drift only around their nominal frequency, the rate and amplitude of the drift can be well characterized by recording the pairwise antenna site timing errors over time. The timing error between any pair of antenna sites can then be predicted, measured, and adjusted in later processing at any particular instant in time.

This preferred embodiment takes advantage of the digital signal processing in other subsystems of the location system. For example, in the baseband convertor subsystem 10-2, the final mixing stage is accomplished digitally in software, using a digitally synthesized intermediate frequency whose frequency and phase can be completely controlled in software. The relative frequency and phase drift can be characterized as error terms in the digital signal processing and, more importantly, in the digital mixing stages. In this manner, timing is effectively locked between antenna sites. Because this third method of timing results in locked timing between antenna sites with the least amount of frequency and phase noise, it is preferred over the other timing schemes.

Calibration Subsystem 10-9

The calibration subsystem 10-9 is responsible for calculating the effects of various systemic errors in the antenna site system, and then applying the results of these calculations to the processing of the transmission(s) received by the antenna site system 10. Systemic errors occur due to fluctuations in the weather, including temperature and humidity, in the temperature of the equipment comprising the location system, or even in the power used by the location system. The systemic errors can occur periodically or randomly, and can effect changes in the relative delays (propagation times) of signals through communications paths in the antenna site system. These delays generally occur while the responsive transmissions are at an RF level. For example, the cable connecting an antenna at the top of a tower to the antenna site system in a ground based enclosure may become heated by the sun and experience a variation in its normal signal delay characteristics.

A preferred embodiment of the calibration subsystem 10-9 is similar to the timing subsystem in that its operation is based upon the installation of reference transmitters in the geographic area served by the location system. Because the reference transmitters are in known and fixed locations, the theoretical delay measurements can be mathematically determined. When the calibration subsystem 10-9 is notified by the database subsystem 10-5 that a calibration transmission is currently being processed, the calibration subsystem will receive the results of the processing. Based upon the present results, the results from recent historical processing, and the theoretical delay values, the calibration system will determine a site bias, or error term, for that antenna site. The error term represents the present accumulation of systemic errors from all sources. This error term is used by the signal processing subsystems 10-4, 12-3 at the antenna site and the central site to adjust the delay measurements calculated for all other responsive transmitters. The error is also used by the position and speed determination subsystem 12-4.

Antenna Site Controller 10-10

One presently preferred embodiment of the antenna site controller 10-10 is a software based microprocessor responsible for the orderly operation and maintenance of all functions and subsystems in the antenna site system 10. The antenna site controller can generate and receive commands from all subsystems and the central site 12 via the communications link that connects each antenna site to the central site. For example, the antenna site controller may update tables in the database subsystems 10-5 based upon instructions from the central site.

III. Central Site System 12

Referring to FIG. 4, presently preferred embodiments of the central site system 12 comprise a reception means 12-1 for receiving transmissions from the various antenna sites and decompressing the transmissions so as to restore the original digital data frames that existed prior to compression by the antenna site systems 10; a dynamic selection and control subsystem 12-2 for determining how data frames from various antenna sites will be processed; a signal processing subsystem 12-2 for further processing the data frames to generate data identifying the mobile transmitter and the differences in times of arrival and the differences in frequency of arrival of the responsive signal among the antenna site systems; a position and speed determination subsystem 12-4 for using the differences in time of arrival and frequency of arrival to determine the geographic location of a transmitter using a prescribed geographic coordinate system, as well as the speed and direction of travel of the transmitter; and a database subsystem 12-5 for determining how the results of the measurements and calculations performed by the various subsystems should be used. The options for using the results include storing the results, forwarding the results to other applications for further processing, or discarding the results.

Reception Means 12-1

The reception means 12-1 is responsible for operation and maintenance of the communications links that connect each antenna site system 10 to the central site system 12 and the decompression of the data bits from a compressed state to an original state fully representing the responsive transmission. The communications links may be any of a variety of standard links, such as copper, fiber optic, or microwave links. The transmission speed of a communications link is determined by the amount of traffic that any particular antenna site receives and the transmission delays that are acceptable to the subscribers of the location service. For example, as discussed above, a cellular telephone transmission over a reverse control channel may generate approximately 100,000 bits prior to compression at the antenna site. Compression may reduce this by a factor of three to four, resulting in approximately 30,000 bits that must be sent over the communications link. If the antenna site receives an average of one transmission per second, the subscriber must use a communications link of at least 30 kbps. If the antenna site typically receives more than one transmission per second, the link speed (bandwidth) must be increased proportionately. Communications links typically offer speeds in increments of 56 kbps or 64 kbps, up to a "T1" speed of 1.544 Mbps. The present invention may be practiced with any of these transmission speeds.

After receiving a data frame from an antenna site, the data frame is decompressed using the inverse of the algorithms used to compress the data at the antenna site system 10. The restored data frames are then forwarded to the selection and control subsystem 12-2. Preferably, the reception means 12-1 is capable of simultaneously processing data received via the communications links from all antenna site systems 10. In a medium sized geographic area, there may be 20 to 40 antenna sites connected to a central site. In a large sized geographic area, there may be well over 100 antenna sites connected to a central site.

Dynamic Selection and Control Subsystem 12-2

The dynamic selection and control subsystem 12-2 is responsible for determining which data frames from which antenna site locations will be used by the signal processing subsystem 12-3 to calculate the location of a responsive transmitter. Since 20 to 40 antenna sites may be located in a medium sized geographic area, any one responsive transmission will likely not be received at all antenna sites. Therefore, processing data frames from all antenna sites is inefficient. Data frames are required from a minimum of three antenna sites for trilateration or triangulation. It is preferred to process data frames from more than three antenna sites so that the location may be overdetermined and the accuracy improved.

The dynamic selection subsystem 12-2 operates on the basis of the stored knowledge of the location and relative orientation of the antenna sites systems. When a responsive transmission occurs, the transmission is typically received at different power levels at the different antenna sites. For example, if the transmitter is a cellular telephone, the responsive transmission is generally received at the highest power level at the antenna site collocated with the cell site communicating with the cellular telephone. Because power generally declines with the square of the distance, more distant antenna sites will receive the signal at lower power levels.

For a particular responsive transmission, the dynamic selection subsystem 12-2 will receive data frames from all antenna sites that have received the transmission. The dynamic selection subsystem dynamically organizes the data by matching all transmissions with the same identification bits, channel number, and relatively close time stamps. The reader should note that some transmitters, such as cellular telephones, may emit several transmissions over a short period of time. Therefore, because it is possible that one antenna site system will miss a first transmission but receive a second transmission, the transmissions should be carefully organized by time so as to discriminate the transmissions.

For all received transmissions identified as having originated from the same transmitter, the dynamic selection subsystem 12-2 compares the power levels, quality factors, and error counts from the different antenna sites. Based upon highest power level and lowest error count, the subsystem identifies the likely closest antenna site to the transmitter. Beginning with this first antenna site, the subsystem then sequentially examines the data frames received from each of the next closest antenna sites to identify the second, third, fourth, etc., sites that should be used in the subsequent signal processing. If data frames are received from more than a threshold number of antenna sites, the dynamic selection subsystem 12-2 examines the quality factors and error counts to determine which data frames, if any, are the best candidates for retention or exclusion. If the error count of the data frames from a particular antenna site is greater than a threshold value, 10 bits for example, that data frame from that antenna site may be discarded. If the quality factor of the data frames from a particular antenna site is worse than a threshold value, 200% worse than the average quality factor for example, that data frame from that antenna site may be discarded. Preferably, the dynamic selection subsystem 12-2 attempts to retain data frames from at least the threshold number of antenna sites, unless the error counts and quality factors are sufficiently poor from antenna sites so as to mandate their exclusion even if less than the threshold number of data frames remains. If the dynamic selection subsystem cannot retain the data frames from at least three antenna sites, the processing for this transmission is discarded and a coded transmission is sent to the central site database subsystem 12-5 to indicate that processing was abandoned for this transmission.

When the dynamic selection subsystem 12-2 has identified and selected data frames for further processing, a control portion of this subsystem forwards the pairwise identification of the frames to the signal processing subsystem 12-3. For example, if data frames from six antenna sites have been retained, these frames are identified as A, B, C, D, E, and F. The control portion of the dynamic selection subsystem 12-2 meters the pair combinations A-B, A-C, A-D, etc., to the signal processing subsystem 12-3 until all appropriate pair combinations have been completed.

Signal Processing Subsystem 12-3

The signal processing subsystem 12-3 is responsible for providing a time difference of arrival and frequency difference of arrival of a responsive transmission between each pair of antenna site data frames forwarded by the dynamic control subsystem 12-2. The time difference of arrival indicates the difference in time between the arrival of the responsive transmission at a first antenna site and a second antenna site. The signal processing subsystem 12-3 attempts to estimate the time difference to better than 0.25 microsecond and preferably to better than 0.1 microsecond. The frequency difference of arrival indicates the perceived Doppler shift of the responsive transmission due to the motion of the transmitter relative to the fixed antenna sites. The signal processing subsystem attempts to estimate the Doppler shift to better than 0.5 Hz and preferably to better than 0.1 Hz.

The estimation of the Doppler shift is generally affected by "chirp", which is inherent in the design of the circuitry within the transmitter. Since the transmitters of primary interest emit bursty signals by definition, the transmitters must shift from a quiescent resting state to a transmitting state and then back to the resting state. As the internal circuits shift from the resting to the transmitting states, the exact transmitting carrier frequency changes over time, eventually settling at the nominal frequency set by the transmitter. A small amount of chirp may also be caused by acceleration of the phone or by the modulation scheme used. These other sources are generally minor compared to the chirp caused by the transmitter. As used herein, "chirp" is defined as a time varying derivative component of the signal's carrier as received at the antenna array.

In order to simultaneously estimate the time difference (delay) and the frequency difference (Doppler) of the responsive signal while overcoming the effects of multipath, chirp, and other signal aberrations, the signal processing subsystem 12-3 implements a maximum likelihood estimation algorithm. Maximum likelihood algorithms have been well studied in the art, and mathematically are represented as the magnitude of the "Time-Frequency Cross Correlation" function:

$$R_{x_1x_2}(\tau,\Omega) = \left| \int_{-\infty}^{\infty} X_1(t-\tau) X_2^*(t) e^{-i\Omega t} dt \right|$$

where $X_1(t)$ and $X_2(t)$ are the complex envelopes of the received signals:

$$X_1(t) = Re\{X_1(t) e^{i\omega_o t}\}$$

$$X_2(t) = Re\{X_2(t) e^{i\omega_o t}\}$$

In the above equations, $\tau$ represents the delay, $\Omega$ represents Doppler shift, t represents time, $\omega_o$ represents the frequency of the responsive signal, $X_1(t)$ represents the complex envelope of the responsive signal as received at a first antenna site, $X_2(t)$ represents the complex envelope of the responsive signal as received at a second antenna site, "Re" represents the real portion the signal, and "$R_{x1x2}$" is the output of the function being maximized. In practice, the integration need be performed only over the time period of the responsive signal.

The exact implementation of this function in the signal processor 12-3 is related to the signal structure of the responsive signal. For example, the implementation may vary for a cellular telephone, for a CDPD mobile unit, and for a RAM Mobile Data unit. All implementations result in the creation of a final output matrix, where the (i, j) indices of the matrix represent possible estimates of the delay $\tau$ and Doppler shift $\omega$ values, and where the values assigned to each cell in the matrix represent the value of the magnitude of the "Time-Frequency Cross Correlation" output function described above. The absolute peak of the matrix is next determined, and then a fine interpolation is performed to resolve possible better estimates of the delay and Doppler shift that may occur between any discrete values of i and j. The results of the fine interpolation are assigned to the delay and Doppler shift for each antenna site pair (i.e., A-B, A-C, A-D, etc.). The magnitude of the output function is also determined along with the width of the magnitude function at a predetermined point. The magnitude, width, and quality factor determined by the multi-antenna processing subsystem 10-3 (FIG. 2) are combined to generate a new quality factor for the estimates of the delay $\tau$ and Doppler shift $\omega$ values. This quality factor is akin to a statistical confidence interval measure. These three values are forwarded to the position and speed determination subsystem 12-4 (FIG. 4).

Position And Speed Determination Subsystem 12-4

The position and speed determination subsystem 12-4 is responsible for using the estimates of time difference of arrival and frequency difference of arrival to calculate the estimated geographic position, speed, and direction of travel of the transmitter. In the position calculation, the subsystem automatically incorporates Geographic Dilution of Precision, or GDOP, into its estimation. Once the signal processing subsystem 12-3 has processed data from all pairs of antenna sites, the position and speed determination subsystem creates a table indicating all processed antenna sites and the calculated delay values and frequency values.

The position and speed determination subsystem 12-4 operates by performing a coarse estimate and then a fine estimate. It first creates a grid of possible latitude and longitude positions, at certain increments, which may be one-half (½) minute for example. For each antenna site pair for which data is available, the position and speed determination subsystem calculates the theoretical delay values from every point on the grid to each pair of antenna sites. Then, at each point, the subsystem obtains the sum of the squares of the observed delays minus the computed delays. The coarse estimate is the point at which the sum of squares is minimized. This least squares difference calculation takes into account the quality factor determined earlier. Therefore, the least squares difference equation takes the form:

$$LSD = [Q_{12}(Delay\_T_{12}\text{-}Delay\_O_{12})^2 + Q_{13}(Delay\_T_{13}\text{-}Delay\_O_{13})^2 + \ldots + Q_{xy}(Delay\_T_{xy}\text{-}Delay\_O_{xy})^2]$$

where $Delay\_T_{xy}$ represents the theoretical delay between antenna sites x and y, x and y being indices representative of antenna sites; $Delay\_O_{xy}$ represents the observed delay between antenna sites x and y; and $Q_{xy}$ represents the quality factor for the delay measurement between antenna sites x and y.

From the coarse estimate, the subsystem refines the estimate by performing a series of linearized-weighted-least-squares iteration steps until the adjustment on each iteration step is below some threshold, which may be 0.0001 degree for example. In a similar fashion, the position and speed determination subsystem 12-4 estimates velocity (speed and direction) by performing a grid search. Theoretical frequency values are calculated rather than delays. However, the process is otherwise analogous to the position determination process. Typical thresholds used may be one mile per hour and one degree of azimuth.

Database Subsystem 12-5

The database subsystem 12-5 is responsible for storing customer, billing, and location information, and for providing access to the location data to the various applications discussed below. For example, if the location system were locating cellular telephones, the database subsystem would preferably contain the customers' name, address, phone identification (MIN) and ESN for all phones registered to the customer on the system, and the status of various applications to which the customer may have subscribed. For example, the customer may subscribe to a cellular service whereby phone calls are rated (i.e., billed) differently depending upon where the customer is located. Alternatively, the customer may elect to inhibit the locating of his telephone, and this election may be stored in the database at the central site and the antenna sites. Location processing may then be blocked for that customer. Whenever a new transmitter is detected that has not been previously registered in the database, that new transmitter is located and then logged into the database automatically. For example, if a "roaming" cellular telephone or other transmitter enters the geographic area covered by the location system, that telephone would automatically be located and then entered into the database.

The database subsystem 12-5 may be accessed locally via terminals or may be accessed remotely by subscribers and various applications. For example, a portable PC with mapping software and CDPD functionality may access the database to determine its own location. Alternately, a dispatcher from a delivery company may access the database to locate many packages or trucks. Because of the confidential nature of the data stored in the database, the database subsystem preferably incorporates various security measures to prevent unauthorized access to data.

The database subsystem 12-5 also stores historical location information that can be used for billing customers or for historical analysis. If, for example, the location system operator desires to bill customers by the amount of processing time used or location points processed, the billing system can provide the location and time detail. Alternatively, a bus transport company may desire to analyze historical data to determine if the buses are operating on efficient routes.

Historical data may be automatically archived after a period of time or, alternatively, the data may be automatically purged from the system.

The database subsystem 12-5 can also store electronic mapping data and then use this mapping data to make adjustments to the estimated position. For example, if the location system estimates the location of a transmitter to be within a building and moving at 50 miles per hour, and the mapping database knows that a highway runs within 100 feet of the building, the database may adjust the location estimate to indicate that the transmitter is more likely to be on the highway than in the building. This feature of intelligently "snapping" the location estimate to a nearby highway enables the database to serve Intelligent Vehicle Highway Systems by providing crucial traffic data.

IV. Applications

There are a variety of commercially valuable applications of the present invention. For example, in addition to the basic function of tracking the location of a mobile transmitter, the present invention may be employed to offer location system subscribers billing rates that vary on the basis of the location from which a transmission was made. For example, a location tape, containing a record over time of the locations of the subscribers' transmitter, may be merged with a billing tape to produce a modified billing tape. The billing tape contains data indicating the cost for each transmission made within a certain time period. This cost is based upon one or more predetermined billing rates. The modified billing data is based upon a different rate for transmissions made from certain specified locations.

The invention may also be employed to provide emergency assistance, for example, in response to a "911" call. In this application, the location system includes means for automatically sending location information to a specified receiving station in response to receiving a "911" signal from a cellular telephone.

Further, the invention may be employed in connection with an alarm service. In this application, a means is provided for comparing the current location of a given transmitter with a specified range of locations and indicating an alarm condition when the current location is not within the prescribed range.

Yet another application involves detecting a lack of signal transmissions by a given transmitter and in response thereto automatically paging the transmitter to cause it to initiate a signal transmission. This allows the system to locate a transmitter that has failed to register itself with the system. Such a feature could be used, for example, to generate an alarm for subscribers at remote locations.

Still another application involves estimating a time of arrival of a given transmitter at a specified location. This application is useful, for example, in connection with a public transportation system to provide estimated times of arrival of buses along established routes.

As mentioned above, the invention may also be employed in locating packages in transit, wherein the packages carry a small transmitting device like a cellular telephone but not capable of voice communication.

The invention may also be employed in tracking vehicles (cars, trucks, buses, trains, etc.), or even persons (e.g., children or prisoners).

Further, the invention may be employed in connection with an Intelligent Vehicle Highway System. In such an application, the invention may include "snap-to" functions on a map. That is, the location system would snap the estimated point to the closest road on a map. In connection with this or another application, a "confidence interval" may be provided with the estimated point.

As described in detail in U.S. patent application Ser. No. 08/105,506, filed Aug. 11, 1993, "Methods and Apparatus for Increasing the Efficiency of a Cellular Telephone Location System," the invention may be used to create a Virtual Location Area unique to each transmitter. For example, when a cellular telephone transmits on a reverse control channel, the telephone location system would determine the geographic position of the phone at that point in time. Using the position and time as a starting point, the system would determine a feasible location area for the subscriber over some foreseeable time. This feasible location area is designated a "Virtual Location Area" for that telephone. The system would then determine which cell sites cover that Virtual Location Area. If a call is placed to that subscriber, the cellular system would page the subscriber only over the forward control channels on the cell sites covering that Virtual Location Area. Thus, the invention allows the system to avoid needlessly using forward control channel bandwidth in cell sites for which there is no chance of reaching the subscriber.

We claim:

1. A process for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising the steps of:

(a) receiving a bursty responsive transmission from said standard mobile transmitter at first, second, and third ground-based antenna sites:

(b) digitalizing the received bursty responsive transmission at each of said first, second, and third antenna sites;

(c) determining first, second, and third time differences of arrival, said first time difference of arrival representing a difference between the time of arrival of said responsive transmission at said first and second antenna sites, said second time difference of arrival representing a difference between the time of arrival of said responsive transmission at said first and third antenna sites, and said third time difference of arrival representing a difference between the time of arrival of said responsive transmission at said second and third antenna sites; and (d) estimating the location of said standard mobile transmitter on the basis of at least said first, second, and third time differences of arrival;

wherein the step of estimating the position of the mobile transmitter comprises making a coarse estimate by creating a grid of possible latitude and longitude positions for each antenna site pair; calculating, for pairs of antenna sites, theoretical time difference of arrival values from points on the grid; determining a function of a sum of squares of the measured time differences of arrival minus the computed time differences of arrival; and coarsely estimating the position as the point at which the function of the sum of squares is a minimum.

2. A process as recited in claim 1, wherein the coarse estimation step further includes deriving quality factors representing the quality of the signal received at the antenna sites of said pairs, and the determination of the function of the sum of squares includes weighting the squares of the measured time differences of arrival minus the computed time differences of arrival by the quality factor.

3. A process as recited in claim 1, further comprising providing a confidence interval along with the location estimate, wherein said confidence interval defines an area around the estimated location and there is a probability the mobile transmitter is located within said area.

4. A process for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising the steps of:

(a) receiving a bursty responsive transmission from said standard mobile transmitter at first, second, and third ground-based antenna sites;

(b) digitalizing the received bursty responsive transmission at each of said first, second, and third antenna sites;

(c) determining first, second, and third time differences of arrival, said first time difference of arrival representing a difference between the time of arrival of said responsive transmission at said first and second antenna sites, said second time difference of arrival representing a difference between the time of arrival of said responsive transmission at said first and third antenna sites, and said third time difference of arrival representing a difference between the time of arrival of said responsive transmission at said second and third antenna sites;

(d) estimating the location of said standard mobile transmitter on the basis of at least said first, second, and third time differences of arrival;

(e) determining first, second, and third frequency differences of arrival, said first frequency difference of arrival representing a difference between the frequency of said responsive transmission as received at said first and second antenna sites, said second frequency difference of arrival representing a difference between the frequency of said responsive transmission as received at said first and third antenna sites, and said third frequency difference of arrival representing a difference between the frequency of said responsive transmission as received at said second and third antenna sites; and (f) estimating the velocity of said standard mobile transmitter on the basis of at least said first, second, and third frequency differences of arrival;

wherein the step of estimating the velocity of the mobile transmitter comprises making a coarse estimate by creating a grid or table of possible velocities; calculating, for pairs of antenna sites, theoretical frequency difference of arrival values corresponding to said possible velocities; determining a function of a sum of squares of the measured frequency differences of arrival minus the computed frequency differences of arrival; and coarsely estimating the velocity as the velocity at which the function of the sum of squares is a minimum.

5. A process for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising the steps of:

(a) receiving a bursty responsive transmission from said standard mobile transmitter at first, second, and third ground-based antenna sites;

(b) digitalizing the received bursty responsive transmission at each of said first, second, and third antenna sites;

(c) determining first, second, and third time differences of arrival, said first time difference of arrival representing a difference between the time of arrival of said responsive transmission at said first and second antenna sites, said second time difference of arrival representing a difference between the time of arrival of said responsive transmission at said first and third antenna sites, and said third time difference of arrival representing a difference between the time of arrival of said responsive transmission at said second and third antenna sites; and (d) estimating the location of said standard mobile transmitter on the basis of at least said first, second, and third time differences of arrival;

wherein the reception and processing of the responsive signal at each antenna site comprises the stems of receiving the responsive signal with an antenna array at each antenna site and providing a high quality signal for further processing; wherein the high quality baseband signals are provided at the respective antenna sites by coherently combining multiple baseband signals so as to reduce the effects of multipath; and further comprising the steps of:

(1) generating a substantially unimpaired representation of the baseband signal by remodulating a demodulated signal;

(2) determining which antenna in the array likely received the transmission over the shortest and most direct path;

(3) performing a correlation between the generated, unimpaired representation of the signal and each of the signals received through each of the antennas, and generating a correlation output function for each signal;

(4) determining the relative amount of multipath impairment that may have occurred at each antenna by measuring the width of each correlation output function at a predefined point on the correlation output function;

(5) coherently combining the signals that appear to have similar multipath impairments to increase the quality of the signal representation; and (6) estimating a quality factor that is indicative of the relative amount of impairment that will remain in the signal after processing.

6. A process for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising the steps of:

(a) receiving a bursty responsive transmission from said standard mobile transmitter at first, second, and third ground-based antenna sites;

(b) digitalizing the received bursty responsive transmission at each said first, second, and third antenna sites;

(c) determining first, second, and third time differences of arrival, said first time difference of arrival representing a difference between the time of arrival of said responsive transmission at said first and second antenna sites, said second time difference of arrival representing a difference between the time of arrival of said responsive transmission at said first and third antenna sites, and said third time difference of arrival representing a difference between the time of arrival of said responsive transmission at said second and third antenna sites; and (d) estimating the location of said standard mobile transmitter on the basis of at least said first, second, and third time differences of arrival;

wherein the reception and processing of the responsive signal at each antenna site comprises the steps of receiving the responsive signal with an antenna array at each antenna site; and providing a high quality signal for further processing; and wherein the step of providing a high quality signal comprises sampling a signal from each antenna in said array and formatting the samples into frames of digital data; and providing, on the basis of the frames of data, a high quality digital baseband signal for further processing; and further comprising extracting selected signal characteristics from the high quality baseband signal; compressing the high quality baseband signal so as to retain the selected characteristics; and forwarding the compressed signal to a prescribed location for further processing.

7. A process as recited in claim 6, wherein the selected characteristics include timing, power, frequency, phase, and a factor representing the quality of the baseband signal.

8. A system for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising:

(a) means for receiving a bursty responsive transmission from said standard mobile transmitter at first, second, and third antenna sites;

(b) means for digitalizing the received bursty responsive transmission at each of said first, second, and third ground-based antenna sites;

(c) means for determining first, second, and third time differences of arrival, said first time difference of arrival representing a difference between the time of arrival of said responsive transmission at said first and second antenna sites, said second time difference of arrival representing a difference between the time of arrival of said responsive transmission at said first and third antenna sites, and said third time difference of arrival representing a difference between the time of arrival of said responsive transmission at said second and third antenna sites; and (d) means for estimating the location of said standard mobile transmitter on the basis of at least said first, second, and third time differences of arrival;

wherein the means for estimating the position of the mobile transmitter comprises means for making a coarse estimate by creating a grid of possible latitude and longitude positions for each antenna site pair; calculating, for pairs of antenna sites, theoretical time difference of arrival values from points on the grid; determining a function of a sum of squares of the measured time differences of arrival minus the computed time differences of arrival; and coarsely estimating the position as the point at which the function of the sum of squares is a minimum.

9. A system as recited in claim 8, wherein the means for making a coarse estimation further includes means for deriving quality factors representing the quality of the signal received at the antenna sites of said pairs, and weighting the squares of the measured time differences of arrival minus the computed time differences of arrival by the quality factor.

10. A system as recited in claim 8, further comprising means for providing a confidence interval along with the location estimate, wherein said confidence interval defines an area around the estimated location and there is a probability the mobile transmitter is located within said area.

11. A system for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising:

(a) means for receiving a bursty responsive transmission from said standard mobile transmitter at first, second, and third antenna sites;

(b) means for digitalizing the received bursty responsive transmission at each of said first, second, and third ground-based antenna sites;

(c) means for determining first, second, and third time differences of arrival, said first time difference of arrival representing a difference between the time of arrival of said responsive transmission at said first and second antenna sites, said second time difference of arrival representing a difference between the time of arrival of said responsive transmission at said first and third antenna sites, and said third time difference of arrival representing a difference between the time of arrival of said responsive transmission at said second and third antenna sites;

(d) means for estimating the location of said standard mobile transmitter on the basis of at least said first, second, and third time differences of arrival;

(e) means for determining first, second, and third frequency differences of arrival, said first frequency difference of arrival representing a difference between the frequency of said responsive transmission as received at said first and second antenna sites, said second frequency difference of arrival representing a difference between the frequency of said responsive transmission as received at said first and third antenna sites, and said third frequency difference of arrival representing a difference between the frequency of said responsive transmission as received at said second and third antenna sites; and (f) means for estimating the velocity of said standard mobile transmitter on the basis of at least said first, second, and third frequency differences of arrival;

wherein the means for estimating the velocity of the mobile transmitter comprises means for making a coarse estimate by creating a grid of possible velocities; calculating, for pairs of antenna sites, theoretical frequency difference of arrival values from points on the grid; determining a function of a sum of squares of the measured frequency differences of arrival minus the computed frequency differences of arrival; and coarsely estimating the velocity as the velocity at which the function of the sum of squares is a minimum.

12. A system for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising:

(a) means for receiving a bursty responsive transmission from said standard mobile transmitter at first, second, and third antenna sites;

(b) means for digitizing the received bursty responsive transmission at each of said first, second, and third ground-based antenna sites;

(c) means for determining first, second, and third time differences of arrival, said first time difference of arrival representing a difference between the time of arrival of said responsive transmission at said first and second antenna sites, said second time difference of arrival representing a difference between the time of arrival of said responsive transmission at said first and third antenna sites, and said third time difference of arrival representing a difference between the time of arrival of said responsive transmission at said second and third antenna sites; and (d) means for estimating the location of said standard mobile transmitter on the basis of at least said first, second, and third time differences of arrival; comprising an antenna array at each antenna site and means for providing a high quality signal for further processing at each antenna site;

wherein the means for providing a high quality signal comprises means for sampling a signal from each antenna in said array and formatting the samples into frames of digital data, and providing, on the basis of the frames of data, a high quality digital baseband signal for further processing; and wherein the high quality baseband signals are provided at the respective antenna sites by coherently combining multiple baseband signals so as to reduce the effects of multipath; and further comprising means for:

(1) generating a substantially unimpaired representation of the baseband signal by remodulating a demodulated signal;

(2) determining which antenna in the array likely received the transmission over the shortest and most direct path;

(3) performing a correlation between the generated, unimpaired representation of the signal and each of the signals received through each of the antennas, and generating a correlation output function for each signal;

(4) determining the relative amount of multipath impairment that may have occurred at each antenna by measuring the width of each correlation output function at a predefined point on the correlation output function;

(5) coherently combining the signals that appear to have similar multipath impairments to increase the quality of the signal representation; and (6) estimating a quality factor that is indicative of the relative amount of impairment that will remain in the signal after processing.

13. A system for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising:

(a) means for receiving a bursty responsive transmission from said standard mobile transmitter at first, second, and third antenna sites;

(b) means for digitizing the received bursty responsive transmission at each of said first, second, and third ground-based antenna sites;

(c) means for determining first, second, and third time differences of arrival, said first time difference of arrival representing a difference between the time of arrival of said responsive transmission at said first and second antenna sites, said second time difference of arrival representing a difference between the time of arrival of said responsive transmission at said first and third antenna sites, and said third time difference of arrival representing a difference between the time of arrival of said responsive transmission at said second and third antenna sites; and (d) means for estimating the location of said standard mobile transmitter on the basis of at least said first, second, and third time differences of arrival; comprising an antenna array at each antenna site and means for providing a high quality signal for further processing at each antenna site;

wherein the means for providing a high quality signal comprises means for sampling a signal from each antenna in said array and formatting the samples into frames of digital data, and providing, on the basis of the frames of data, a high quality digital baseband signal for further processing; and further comprising means for extracting selected signal characteristics from the high quality baseband signal; compressing the high quality baseband signal so as to retain the selected characteristics; and forwarding the compressed signal to a prescribed location for further processing.

14. A system as recited in claim 13, wherein the selected characteristics include timing, power, frequency, phase, and a factor representing the quality of the baseband signal.

15. A system for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising:

(a) at least three ground-based antenna site systems, each antenna site system comprising: an antenna; a sampling subsystem operatively coupled to said antenna for sampling said bursty responsive signal at a prescribed sampling frequency and formatting the sampled signal into frames of digital data, each frame comprising a prescribed number of data bits and time stamp bits, said time stamp bits representing the time at which said bursty responsive transmission was received; a baseband convertor operatively coupled to said sampling subsystem for providing baseband signals derived from said frames of data; and a timing subsystem operatively coupled to said sampling subsystem for providing timing signals; and (b) a central site system operatively coupled to said antenna site systems, comprising means for processing said frames of data to generate data identifying said mobile transmitter and the differences in times of arrival of said responsive signal among said antenna site systems; and means for determining, on the basis of said times of arrival differences, the location of the mobile transmitter;

and further comprising location estimation means for:

(1) creating a grid of theoretical points covering a prescribed geographic area, said theoretical points being spaced at prescribed increments of latitude and longitude;

(2) calculating theoretical values of time delay for a plurality of pairs of antenna sites;

(3) calculating a least squares difference value based on the theoretical time delays and measured time delays for a plurality of pairs of antenna sites;

(4) searching the grid of theoretical points and determining the best theoretical latitude and longitude for which the value of the least squares difference is minimized; and (5) starting at the best theoretical latitude and longitude, performing another linearized-weighted-least-squares iteration to resolve the actual latitude and longitude to within a prescribed number of degrees or fraction of a degree.

16. A system as recited in claim 15, wherein said calculating step (2) comprises accounting for any known site biases caused by mechanical, electrical, or environmental factors, said site biases determined by periodically calculating the positions of reference transmitters at known locations.

17. A system as recited in claim 15, wherein said least squares difference is given by:

$$LSD=[Q_{12}(Delay\_T_{12}\text{-}Delay\_O_{12})^2+Q_{13}(Delay\_T_{13}\text{-}Delay\_O_{13})^2+\ldots Q_{xy}(Delay\_T_{xy}\text{-}Delay\_O_{xy})^2]$$

where, $Delay\_T_{xy}$ represents the theoretical delay between antenna sites x and y, x and y being indices representative of antenna sites; $Delay\_O_{xy}$ represents the observed delay between antenna sites x and y; $Q_{xy}$ represents a quality factor for the delay measurement between antenna sites x and y, said quality factor being an estimated measure of the degree to which multipath or other anomalies may have affected a particular delay measurement.

18. A system for determining the location of a "standard" mobile transmitter not specifically designed or altered to provide signals facilitating the location of the transmitter, said standard mobile transmitter being operative to receive a message signal and to respond to said message signal by transmitting a bursty responsive transmission indicative of the identity of the standard mobile transmitter, comprising:

(a) at least three ground-based antenna site systems, each antenna site system comprising: an antenna; a sampling subsystem operatively coupled to said antenna for sampling said bursty responsive signal at a prescribed sampling frequency and formatting the sampled signal into frames of digital data, each frame comprising a prescribed number of data bits and time stamp bits, said time stamp bits representing the time at which said bursty responsive transmission was received; a baseband convertor operatively coupled to said sampling subsystem for providing baseband signals derived from said frames of data; and a timing subsystem operatively coupled to, said sampling subsystem for providing timing signals; and (b) a central site system operatively coupled to said antenna site systems, comprising means for processing said frames of data to generate data identifying said mobile transmitter and the differences in times of arrival of said responsive signal among said antenna site systems; and means for determining, on the basis of said times of arrival differences, the location of the mobile transmitter; and further comprising velocity estimation means for:

(1) creating a grid of theoretical points covering a prescribed range of velocities, said theoretical points being spaced at prescribed increments;

(2) calculating theoretical values of frequency difference for a plurality of pairs of antenna sites;

(3) calculating a least squares difference value based on the theoretical frequency differences and measured frequency differences for a plurality of pairs of antenna sites;

(4) searching the entire grid of theoretical points and determining the best theoretical velocity for which the value of least squares difference is minimized; and (5) starting at the best theoretical velocity, performing another linearized-weighted-least-squares iteration to resolve the actual velocity to within a prescribed tolerance.

19. A method for determining the location of a mobile transmitter operative to receive a message signal and to respond to said message signal by transmitting a responsive signal over a predefined messaging channel, said responsive signal being indicative of the identity of the mobile transmitter, comprising the steps of:

(a) receiving said signal at least three separate ground-based antenna sites;

(b) processing said signal at each antenna site to produce frames of data, each frame comprising a prescribed number of data bits and time stamp bits, said time stamp bits representing the time at which said frames were produced at each antenna site;

(c) processing said frames of data to identify said responsive signal and the differences in times of arrival of said responsive signal among said antenna sites; and (d) determining, on the basis of said times of arrival differences, the location of said mobile transmitter;

and further comprising estimating the location of said mobile transmitter by performing the following steps:

(1) creating a grid of theoretical points covering a prescribed geographic area, said theoretical points being spaced at prescribed increments of latitude and longitude;

(2) calculating theoretical values of time delay for a plurality of pairs of antenna sites;

(3) calculating a least squares difference (LSD) value based on the theoretical time delays and measured time delays for a plurality of pairs of antenna sites;

(4) searching the entire grid of theoretical points and determining the best theoretical latitude and longitude for which the value of LSD is minimized; and (5) starting at the best theoretical latitude and longitude, performing another linearized-weighted-least-squares iteration to resolve the actual latitude and longitude to within a prescribed number of degrees or fraction of a degree.

20. A method as recited in claim 19, wherein said calculating step (2) comprises accounting for any known site biases caused by mechanical, electrical, or environmental factors, said site biases determined by periodically calculating the positions of reference transmitters at known locations.

21. A method as recited in claim 19, wherein said least squares difference is given by:

$$LSD=\Sigma Q_{xy}(Delay\_T_{xy}\text{-}Delay\_O_{xy})^2$$

where, $Delay\_T_{xy}$ represents the theoretical delay between antenna sites x and y, x and y being indices representative of antenna sites; $Delay\_O_{xy}$ represents the observed delay between antenna sites x and y; $Q_{xy}$ represents a quality factor for the delay measurement between antenna sites x and y, said quality factor being an estimated measure of the degree to which multipath or other anomalies may have affected a particular delay measurement.

22. A method for determining the location of a mobile transmitter operative to receive a message signal and to respond to said message signal by transmitting a responsive signal over a predefined messaging channel, said responsive signal being indicative of the identity of the mobile transmitter, comprising the steps of:

(a) receiving said signal at least three separate ground-based antenna sites;

(b) processing said signal at each antenna site to produce frames of data, each frame comprising a prescribed number of data bits and time stamp bits, said time stamp bits representing the time at which said frames were produced at each antenna site;

(c) processing said frames of data to identify said responsive signal and the differences in times of arrival of said responsive signal among said antenna sites;

(d) determining, on the basis of said times of arrival differences, the location of said mobile transmitter; and further comprising estimating the velocity of said mobile transmitter by performing the following steps:

(1) creating a grid of theoretical points covering a prescribed range of velocities, said theoretical points being spaced at prescribed increments;

(2) calculating theoretical values of frequency difference for a plurality of pairs of antenna sites;

(3) calculating a least squares difference (LSD) value based on the theoretical frequency differences and measured frequency differences for a plurality of pairs of antenna sites;

(4) searching the entire grid of theoretical points and determining the best theoretical velocity for which the value of LSD is minimized; and (5) starting at the best theoretical velocity, performing another linearized-weighted-least-squares iteration to resolve the actual velocity to within a prescribed tolerance.

* * * * *

UNITED STATES PATENT AND TRADEMARK OFFICE
CERTIFICATE OF CORRECTION

PATENT NO. : 5,608,410
DATED : March 4,1997
INVENTOR(S) : Louis A. Stilp, Curtis A. Knight and John C. Webber It is certified that error appears in the above-indentified patent and that said Letters Patent is hereby corrected as shown below: On the title page, and in Col. 1, in the title delete "CROSS REFERENCE TO RELATED APPLICATIONS".

Col. 13, line 65, the word "Calculated" delete the capital "C".

Col. 14, line 64, the word "AS" delete the capital "S".

Col. 21, line 43, change "ω" to --Ω--

Col. 26, line 16, "stems" should be --steps--.

Signed and Sealed this

Twenty-second Day of July, 1997

Attest:

Attesting Officer

BRUCE LEHMAN

Commissioner of Patents and Trademarks